United States Patent
Van Der Auwera et al.

(10) Patent No.: US 9,344,723 B2
(45) Date of Patent: May 17, 2016

(54) BETA OFFSET CONTROL FOR DEBLOCKING FILTERS IN VIDEO CODING

(71) Applicant: QUALCOMM Incorporated, San Diego, CA (US)

(72) Inventors: Geert Van Der Auwera, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 13/830,720

(22) Filed: Mar. 14, 2013

(65) Prior Publication Data

US 2013/0272425 A1    Oct. 17, 2013

Related U.S. Application Data

(60) Provisional application No. 61/624,088, filed on Apr. 13, 2012.

(51) Int. Cl.
*H04N 7/26* (2006.01)
*H04N 19/80* (2014.01)
*H04N 19/172* (2014.01)
*H04N 19/134* (2014.01)
*H04N 19/117* (2014.01)
(Continued)

(52) U.S. Cl.
CPC ......... *H04N 19/0089* (2013.01); *H04N 19/117* (2014.11); *H04N 19/134* (2014.11); *H04N 19/172* (2014.11); *H04N 19/80* (2014.11); *H04N 19/82* (2014.11); *H04N 19/86* (2014.11)

(58) Field of Classification Search
CPC ............ H04N 19/0089; H04N 19/117; H04N 19/134; H04N 19/172; H04N 19/80; H04N 19/82; H04N 19/86
USPC ..................................... 375/240.24
See application file for complete search history.

(56) References Cited

U.S. PATENT DOCUMENTS 8,005,151 B2   8/2011   Joch et al.
RE42,851 E    10/2011   Kim et al.
(Continued)

OTHER PUBLICATIONS

Second Written Opinion from U.S. Patent Application No. PCT/US2013/035313, dated Apr. 17, 2014, 7 pp.
(Continued)

*Primary Examiner* — Jay Patel
*Assistant Examiner* — Francis G Geroleo
(74) *Attorney, Agent, or Firm* — Shumaker & Sieffert, P.A.

(57) ABSTRACT

Techniques are described for providing continuous control of a deblocking filter for a video block using a beta offset parameter. Deblocking filters are defined based on one or more deblocking decisions. Conventionally, a quantization parameter and a beta offset parameter are used to identify a beta parameter ("β") value that determines threshold values of the deblocking decisions. The value of the beta offset parameter results in a change or increment of the β value. For small increments of the β value, rounding of the threshold values may result in no change and discontinuous control of the deblocking decisions. The techniques include calculating at least one deblocking decision for the deblocking filter according to a threshold value that has been modified based on a multiplier value of the beta offset parameter. The multiplier value applied to the beta offset parameter causes an integer change in the modified threshold value.

42 Claims, 8 Drawing Sheets

(51) Int. Cl.
*H04N 19/82* (2014.01)
*H04N 19/86* (2014.01)

(56) References Cited

U.S. PATENT DOCUMENTS

| | | | |
|---|---|---|---|
| 2005/0175093 | A1 | 8/2005 | Haskell et al. |
| 2006/0227869 | A1* | 10/2006 | Joch et al. ............... 375/240.03 |
| 2008/0199090 | A1* | 8/2008 | Tasaka et al. .................. 382/233 |
| 2008/0317377 | A1* | 12/2008 | Saigo et al. ................... 382/274 |
| 2010/0315555 | A1* | 12/2010 | Sakurai et al. ................ 348/563 |
| 2011/0194614 | A1 | 8/2011 | Norkin et al. |
| 2012/0014450 | A1 | 1/2012 | Ma et al. |
| 2012/0082219 | A1 | 4/2012 | Sun et al. |
| 2012/0321206 | A1* | 12/2012 | Sato .............................. 382/233 |

OTHER PUBLICATIONS

International Preliminary Report on Patentability from International Application No. PCT/US2013/035313, dated Jul. 21, 2014, 9 pp.
An et al., "CE12 Subtest 1: Improved Deblocking Filter", 20110309. No. JCTVC-E079, Mar. 16-23, 2011, XP030008585, ISSN: 0000-0007, 8 pp.
Van Der Auwera et al., "CE6.b: SDIP Harmonization with Deblocking, MDIS and HE Residual Coding", MPEG Meeting; Jul. 14-22, 2011; Torino; (Motion Picture Expert Group or ISO/IEC JTC1/SC29/WG11) No. m20989, XP030049552, 22 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "WD6: High Efficiency Video Coding (HEVC) text specification draft 6 (version JCTVC-H1003_dA)", Joint Collaborative Team on Video Coding (JCT-VC) of ITU-T SG16 WP3 and ISO/IEC JTC1/SC29/WG11 7th Meeting: Geneva, CH, Nov. 21-30, 2011, XP55054460, 259 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
International Search Report and Written Opinion—PCT/US2013/035313—ISA/EPO—Jul. 30, 2013, 18 pp.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Lu et al., "AHG6: On deblocking filter parameter", JCT-VC Meeting; Mpeg Meeting; Apr. 27-May 7, 2012; Geneva; (Joint Collaborative Team on Video Cooing of ISO/IEC JTC1/SC29/1/VG11 and ITU-T SG.16 ); URL: http://wftp3.itu.int/av-arch/jctvc-site/,, No. JCTVC-I0071, XP030111834, 14 pp.
Lu et al., "AHG6: On deblocking filter parameters", JCT-VC Meeting; Mpeg Meeting; Jul. 11-20, 2012; Stockholm; (Joint Collaborative Team on Video Coding of ISO/IEC JTC1/SC291/VG11 and ITU-T SG.16 ); URL: http://wftp3.itu.int/av-arch/jctvc-site/ No. JCTVC-J0181, XP030112543, 13 pp.
Narroschke et al., "CE10.1: Symmetric rounding in the deblocking filter", JCT-VC Meeting; Mpeg Meeting; Feb. 1-10, 2012; San Jose; (Joint Collaborative Team on Video Coding of ISO/IEC JTC1/SC291 WG11 and ITU-T SG.16 ); URL: http://wftp3.1tu.int/av-arch/jctvc-site/ No. JCTVC-H0147, XP030111174, 8 pp.
Norkin et al., "Deblocking filter length adjustment", JCT-VC Meeting; MPEG Meeting; Apr. 27-May 7, 2012; Geneva; (Joint Collaborative Team on Video Coding of ISO/IEC JTC11SC29/WG11 and ITU-T SG.16 ); URL: http://wftp3.itu.int/av-arch/jctvc-sjte/ No. JCTVC-I0542, XP030112305, 10 pp.
Norkin et al., "Non-CE12: deblocking parameters signaling in slice header", JCT-VC Meeting; MPEG Meeting; Nov. 21-30, 2011; Geneva; (Joint Collaborative Team on Video Coding of ISO/IEC JTC1/SC29/ WG11 and ITU-T SG.16 ); URL: http://wftp3.1tu.int/av-arch/jctvc-site/ No. JCTVC-G619, XP030110603, 4 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.

* cited by examiner

| p7$_0$ | p6$_0$ | p5$_0$ | p4$_0$ | p3$_0$ | p2$_0$ | p1$_0$ | p0$_0$ | q0$_0$ | q1$_0$ | q2$_0$ | q3$_0$ | q4$_0$ | q5$_0$ | q6$_0$ | q7$_0$ |
|---|---|---|---|---|---|---|---|---|---|---|---|---|---|---|---|
| p7$_1$ | p6$_1$ | p5$_1$ | p4$_1$ | p3$_1$ | p2$_1$ | p1$_1$ | p0$_1$ | q0$_1$ | q1$_1$ | q2$_1$ | q3$_1$ | q4$_1$ | q5$_1$ | q6$_1$ | q7$_1$ |
| p7$_2$ | p6$_2$ | p5$_2$ | p4$_2$ | p3$_2$ | p2$_2$ | p1$_2$ | p0$_2$ | q0$_2$ | q1$_2$ | q2$_2$ | q3$_2$ | q4$_2$ | q5$_2$ | q6$_2$ | q7$_2$ |
| p7$_3$ | p6$_3$ | p5$_3$ | p4$_3$ | p3$_3$ | p2$_3$ | p1$_3$ | p0$_3$ | q0$_3$ | q1$_3$ | q2$_3$ | q3$_3$ | q4$_3$ | q5$_3$ | q6$_3$ | q7$_3$ |
| p7$_4$ | p6$_4$ | p5$_4$ | p4$_4$ | p3$_4$ | p2$_4$ | p1$_4$ | p0$_4$ | q0$_4$ | q1$_4$ | q2$_4$ | q3$_4$ | q4$_4$ | q5$_4$ | q6$_4$ | q7$_4$ |
| p7$_5$ | p6$_5$ | p5$_5$ | p4$_5$ | p3$_5$ | p2$_5$ | p1$_5$ | p0$_5$ | q0$_5$ | q1$_5$ | q2$_5$ | q3$_5$ | q4$_5$ | q5$_5$ | q6$_5$ | q7$_5$ |
| p7$_6$ | p6$_6$ | p5$_6$ | p4$_6$ | p3$_6$ | p2$_6$ | p1$_6$ | p0$_6$ | q0$_6$ | q1$_6$ | q2$_6$ | q3$_6$ | q4$_6$ | q5$_6$ | q6$_6$ | q7$_6$ |
| p7$_7$ | p6$_7$ | p5$_7$ | p4$_7$ | p3$_7$ | p2$_7$ | p1$_7$ | p0$_7$ | q0$_7$ | q1$_7$ | q2$_7$ | q3$_7$ | q4$_7$ | q5$_7$ | q6$_7$ | q7$_7$ |

FIG. 5

BETA OFFSET CONTROL FOR DEBLOCKING FILTERS IN VIDEO CODING

This application claims to the benefit of U.S. Provisional Application No. 61/624,088, filed Apr. 13, 2012, the entire content of which is incorporated herein by reference.

TECHNICAL FIELD

This disclosure relates to video coding, and more particularly, to deblocking video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so called "smart phones," video teleconferencing devices, video streaming devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode that defines how the predictive block is created and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for providing continuous control of a deblocking filter for a video block using a beta offset parameter. Deblocking filters are defined based on one or more deblocking decisions. Conventionally, a quantization parameter ("QP") and a beta offset parameter are used to identify a beta parameter ("β") value that determines threshold values, e.g., β, β/8, or 3β/16, of the deblocking decisions. The value of the beta offset parameter results in a change or increment of the beta parameter value ("Δβ") over the value of β for the QP value alone. When the beta offset parameter results in a small increment of the beta parameter value (e.g., Δβ=4), rounding of the threshold values may result in no change to at least some of the threshold values and discontinuous control of the respective deblocking decision.

The techniques of this disclosure include calculating at least one deblocking decision for the deblocking filter according to a threshold value that has been modified based on a multiplier value of the beta offset parameter. According to the techniques, the multiplier value applied to the beta offset parameter causes an integer change in the modified threshold value. In one example, the threshold value may be directly modified by adding a multiplier value of the beta offset parameter to the original threshold value where the multiplier value of the beta offset parameter causes an integer change in the modified threshold. In another example, the threshold value may be indirectly modified by identifying a β value based on the multiplier value of the beta offset parameter where the multiplier value of the beta offset parameter results in a Δβ that causes an integer change in the modified threshold. In this way, the techniques provide continuous control behavior of the deblocking filter based on the beta offset parameter.

In one example, this disclosure is directed toward a method of decoding video data, the method comprising decoding a beta offset parameter that controls a deblocking filter for a video block, identifying a beta parameter value used to determine a threshold value of at least one deblocking decision for the deblocking filter, and calculating the deblocking decision for the deblocking filter according to a modified threshold value, wherein the threshold value is modified based on a multiplier value of the beta offset parameter that causes an integer change in the modified threshold value.

In another example, this disclosure is directed toward a method of encoding video data, the method comprising encoding a beta offset parameter that controls a deblocking filter for a video block, identifying a beta parameter value used to determine a threshold value of at least one deblocking decision for the deblocking filter, and calculating the deblocking decision for the deblocking filter according to a modified threshold value, wherein the threshold value is modified based on a multiplier value of the beta offset parameter that causes an integer change in the modified threshold value.

In a further example, this disclosure is directed toward a video coding device comprising a memory that stores video data, and a processor configured to code a beta offset parameter that controls a deblocking filter for a video block, identify a beta parameter value used to determine a threshold value of at least one deblocking decision for the deblocking filter, and calculate the deblocking decision for the deblocking filter according to the threshold value modified based on a multiplier value of the beta offset parameter that causes an integer change in the modified threshold value.

In another example, this disclosure is directed toward a video coding device comprising means for coding a beta offset parameter that controls a deblocking filter for a video block, means for identifying a beta parameter value used to determine a threshold value of at least one deblocking decision for the deblocking filter, and means for calculating the deblocking decision for the deblocking filter according to the threshold value modified based on a multiplier value of the beta offset parameter that causes an integer change in the modified threshold value.

In an additional example, this disclosure is directed toward a computer readable medium comprising instructions for coding video data that when executed cause one or more processors to code a beta offset parameter that controls a deblocking filter for a video block, identify a beta parameter value used to determine a threshold value of at least one deblocking decision for the deblocking filter, and calculate the deblocking decision for the deblocking filter according to the threshold value modified based on a multiplier value of the beta offset parameter that causes an integer change in the modified threshold value.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating pixel positions near an edge between two video blocks.

DETAILED DESCRIPTION

Figure 1:
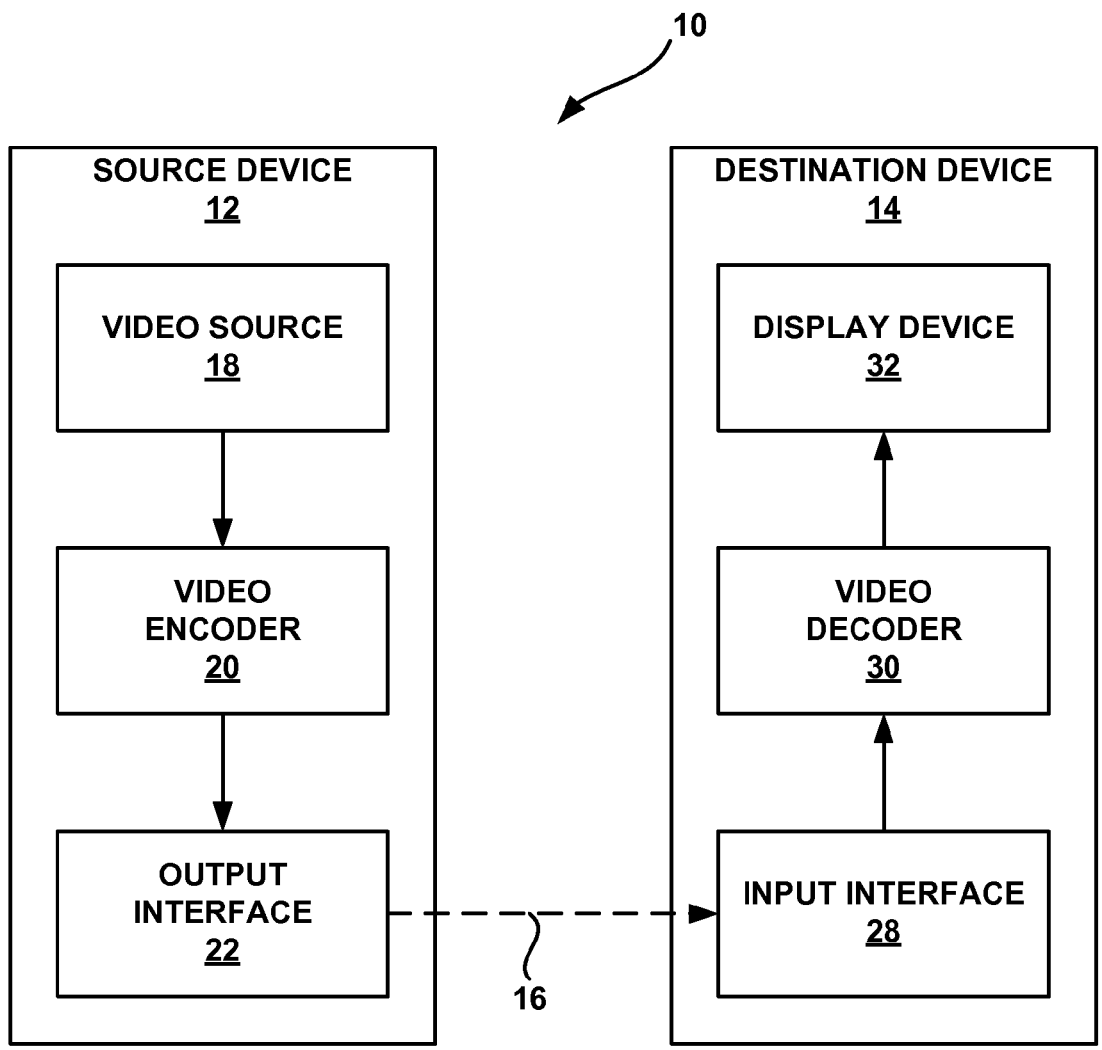
FIG. 1 is a block diagram illustrating an example video encoding and decoding system that may utilize the techniques described in this disclosure to provide continuous control of deblocking filters with beta offset parameters.

This disclosure describes techniques for providing continuous control of a deblocking filter for a video block using a beta offset parameter. In the High Efficiency Video Coding (HEVC) standard, a deblocking filter, when applied, removes blockiness artifacts from edges of a decoded video block. The deblocking filter for a given video block is defined based on results from one or more deblocking decisions for the video block. The deblocking decisions are calculated according to threshold values based on a deblocking parameter value $\beta$, and a strength of the deblocking filter is determine according to a deblocking parameter value $t_C$. To ensure that the same deblocking filter is used for both encoding and decoding the video block, deblocking offset parameters are signaled as syntax elements in a bitstream to a video decoder to identify the deblocking parameter values. In this way, the deblocking filter for the video block is controlled based on the signaled deblocking offset parameters. The deblocking offset parameters may be signaled in one or more of a slice header and a picture layer parameter set. The picture layer parameter set may comprise either a picture parameter set (PPS) or an adaptation parameter set (APS).

Conventionally, a quantization parameter ("QP") value and a beta offset parameter ("beta_offset") are used to calculate an index parameter for the beta parameter ("$\beta$") value. The index parameter is used to identify the $\beta$ value that determines threshold values of the deblocking decisions. For example, the deblocking decisions for a video block may include one or more of an on/off deblocking decision with an original threshold value equal to $\beta$, a strong/weak deblocking decision with an original threshold value equal to $\beta/8$, and a weak filter width deblocking decision with an original threshold value equal to $3\beta/16$. The value of the beta offset parameter results in a change or increment of the beta parameter value ("$\Delta\beta$") over the $\beta$ value for the QP value alone. When the beta offset parameter results in a small increment of the beta parameter value (e.g., $\Delta\beta=4$), rounding of thresholds $\beta/8$ and $3\beta/16$ may result in no change to the threshold values and discontinuous control of the respective deblocking decision depending on the initial $\beta$ value.

The techniques of this disclosure include calculating at least one deblocking decision for the deblocking filter according to a threshold value that has been modified based on a multiplier value of the beta offset parameter. According to the techniques, the multiplier value applied to the beta offset parameter is selected to cause an integer change in the modified threshold value for any value of the beta offset parameter and resulting $\Delta\beta$. The multiplier value comprises an integer value greater than or equal to 1. In some cases, a different multiplier value may be selected for each of the deblocking decisions. In other cases, a single multiplier value may be selected for two or more of the deblocking decisions.

In one example, the threshold value may be directly modified by adding a multiplier value of the beta offset parameter to the original threshold value where the multiplier value of the beta offset parameter causes an integer change in the modified threshold. In this case, a $\beta$ value may be identified for all the deblocking decisions of the deblocking filter using an index parameter based on only the quantization parameter. The modified threshold values may be equal to $\beta+A*$beta_offset for the on/off deblocking decision, $\beta/8+B*$beta_offset for the strong/weak deblocking decision, and $3\beta/16+C*$beta_offset for the weak filter width deblocking decision, where A, B and C are the multiplier values for the respective deblocking decisions.

In another example, the threshold value may be indirectly modified by identifying a $\beta$ value using an index parameter based on the QP value and a multiplier value of the beta offset parameter. In some cases, the multiplier value of the beta offset parameter may be referred to as the beta offset control value. According to the techniques, the beta offset control value includes a multiplier value selected to result in a $\Delta\beta$ that causes an integer change in the modified threshold. The index parameter ("Q") used to identify the $\beta$ value may be equal to QP+N*β_offset, where N is the multiplier value for one or more of the deblocking decisions. When index parameter Q is greater than 27, the beta parameter value $\Delta\beta$=2*N*beta_offset, for a positive beta offset value. The modified threshold values are equal to the original threshold values for the deblocking decisions determined using $\beta+\Delta\beta$. In either of the above examples, the techniques provide continuous control behavior of the deblocking filter based on the beta offset parameter.

FIG. 1 is a block diagram illustrating an example video encoding and decoding system that may utilize the techniques described in this disclosure to provide continuous control of deblocking filters with beta offset parameters. According to the techniques of this disclosure, the threshold values are modified based on multiplier values of a beta offset parameter that cause integer changes in the modified threshold values.

As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, link 16 may correspond to a storage medium that may store the encoded video data generated by source device 12 and that destination device 14 may access as desired via disk access or card access. The storage medium may include any of a variety of locally accessed data storage media such as Blu-ray discs, DVDs, CD-ROMs, flash memory, or any other suitable digital storage media for storing encoded video data. In a further example, link 16 may correspond to a file server or another intermediate storage device that may hold the encoded video generated by source device 12 and that destination device 14 may access as desired via streaming or download. The file server may be any type of server capable of storing encoded video data and transmitting that encoded video data to the destination device 14 Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also be stored onto a storage medium or a file server for later access by destination device 14 for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on a data storage medium, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The Joint Collaborative Team on Video Coding (JCT-VC) is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be partitioned into one or more slices, and each of the slices may be partitioned into a sequence of coding tree units (CTUs) or largest coding units (LCUs) in coding order. A CTU includes both luma and chroma samples and has a similar purpose as a macroblock of the H.264 standard. For example, each CTU may include a luma coding tree block (CTB) and two chroma CTBs. Each CTU may be partitioned into coding units (CUs), and each CTB may be partitioned into coding blocks according to a quadtree. For example, a CTB, as a root node of the quadtree, may be split into four child nodes, and each child node may in turn be a parent node and be split into another four child nodes. A final, unsplit child node, as a leaf node of the quadtree, comprises a coding block. Syntax data associated with a coded bitstream may define a maximum number of times a CTB may be split, and may also define a minimum size of the coding blocks. This syntax data may be included in a CTU of the CTB.

A CU may include a luma coding block and two chroma coding blocks. The CU may have associated prediction units (PUs) and transform units (TUs). Each of the PUs may include one luma prediction block and two chroma prediction blocks, and each of the TUs may include one luma transform block and two chroma transform blocks. Each of the coding blocks may be partitioned into one or more prediction blocks that comprise blocks to samples to which the same prediction applies. Each of the coding blocks may also be partitioned in one or more transform blocks that comprise blocks of sample on which the same transform is applied.

A size of the CU corresponds to a size of the coding block. The size of the CU may range from 8×8 pixels up to the size of the CTU with a maximum of 64×64 pixels or greater. Each CU may define one or more PUs and one or more TUs. Syntax data included in a CU may describe, for example, partitioning of the coding block into one or more prediction blocks. Partitioning modes may differ between whether the CU is skip or direct mode encoded, intra-prediction mode encoded, or inter-prediction mode encoded. Prediction blocks may be partitioned to be square or non-square in shape. Syntax data included in a CU may also describe, for example, partitioning of the coding block into one or more transform blocks according to a quadtree. Transform blocks may be partitioned to be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include the prediction blocks and data defining a motion vector for the prediction blocks in the PU. The data defining the motion vector for the PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. Following prediction, video encoder 20 may calculate residual values corresponding to prediction blocks included in the PUs. The residual values comprise pixel difference values that may be transformed into transform coefficients, quantized, and scanned as transform blocks included in the TUs to produce serialized transform coefficients for entropy coding. This disclosure typically uses the term "video block" to refer to a coding node of a CU, a prediction node of a PU, or a transform node of a TU. In some specific cases, this disclosure may also use the term "video block" to refer to a CTU, a CU, a PU or a TU.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction on prediction blocks in PUs of various sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding of prediction blocks included in the PUs of a CU, video encoder 20 may calculate residual data in transform blocks included in the TUs of the CU. The prediction blocks may comprise pixel data in the spatial domain (also referred to as the pixel domain) and the transform blocks may comprise coefficients in the transform domain following application of a transform, e.g., a discrete cosine transform (DCT), an integer transform, a wavelet transform, or a conceptually similar transform, on the residual data in the transform blocks. The residual data may correspond to pixel differences between pixels of the unencoded picture and prediction values corresponding to the PUs. Video encoder 20 may form the transform blocks including the residual data for the coding block of the CU, and then transform the transform blocks to produce transform coefficients for the coding block.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), probability interval partitioning entropy codes (PIPE), or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In addition to signaling the encoded video data in a bitstream to video decoder 30 in destination device 14, video encoder 20 may also decode the encoded video data and reconstruct the blocks within a video frame or picture for use as reference blocks during the intra- or inter-prediction process for subsequently coded blocks. After dividing a video frame or picture into blocks, encoding the blocks, and then decoding the blocks, however, perceptible artifacts at edges between the blocks may occur. In order to remove these "blockiness" artifacts, video encoder 20 may apply deblocking filters to the decoded video blocks prior to storage as reference blocks. Similarly, video decoder 30 may be configured to decode video data received in a bitstream from video encoder 20 of source device 12, and apply the same or similar deblocking filters to decoded blocks of the video data for purposes of displaying the video data as well as for using the blocks as reference blocks for subsequently decoded video data.

Deblocking filtering performed by a video coding device, such as a video encoder 20 or video decoder 30, prior to storing the blocks for use as reference blocks is generally referred to as "in-loop" filtering, in that the filtering is performed within the coding loop. Accordingly, reference picture data used for predictive coding of other blocks is filtered with a deblocking filter. By configuring both video encoder 20 and video decoder 30 to apply the same deblocking techniques, the video coding devices can be synchronized, such that deblocking filtering does not introduce error for subsequently coded video data that uses the filtered blocks as reference blocks.

Video encoder 20 and video decoder 30 may be configured to determine, for each edge of a video block, including edges of coding blocks, prediction blocks and transform blocks, whether to apply a deblocking filter to deblock the edge. More specifically, the video coding devices may be configured to calculate one or more deblocking decisions in order to define the deblocking filter. For example, the deblocking decisions may define whether to turn on the deblocking filter for the edge and, if the deblocking filter is turned on, a type and width of the deblocking filter for the edge. The deblocking decisions are calculated based on one or more lines of pixels perpendicular to the edge that are referred to as a set of support pixels, or simply "support." In general, the deblocking decisions are configured to detect high-frequency changes within the support pixels. Typically, when a high frequency change is detected, the deblocking decisions provide an indication that perceptible artifacts are present at the edge, and that a deblocking filter of a certain type and width should be applied to deblock the edge. Deblocking filters and the support pixels are described in more detail below with respect to FIGS. 4 and 5.

The deblocking decisions include functions that are calculated at video encoder 20 and video decoder 30 based on the support pixels, and the results of the functions are compared to threshold values. A quantization parameter ("QP") and a beta offset parameter are used to identify a beta parameter ("β") value that determines threshold values, e.g., β, β/8, or 3β/16, of the deblocking decisions. The beta offset parameter provides control of the deblocking filter by enabling selection of a β value that is different from the value that would be selected based only on the QP value. In this way, the value of the beta offset parameter results in a change or increment of the beta parameter value ("Δβ") over the β value for the QP value alone. When the beta offset parameter results in a small increment of the beta parameter value (e.g., Δβ=4), however, rounding of the threshold values may result in no change to at least some of the threshold values and discontinuous control of the respective deblocking decision depending on the initial β value.

The techniques of this disclosure provide continuous, or at least more continuous, control of a deblocking filter for a video block using a beta offset parameter. More specifically, the techniques include calculating at least one deblocking decision for the deblocking filter according to a threshold value that has been modified based on a multiplier value of the beta offset parameter. The multiplier value applied to the beta offset parameter is selected to cause an integer change in the modified threshold value. In one example, the threshold value may be directly modified by adding a multiplier value of the beta offset parameter to the original threshold value where the multiplier value of the beta offset parameter causes an integer change in the modified threshold. In another example, the threshold value may be indirectly modified by identifying a β value based on the particular multiplier value of the beta offset parameter at which the multiplier value of the beta offset parameter results in a Δβ that causes an integer change in the modified threshold. In either example, the techniques provide continuous control behavior of the deblocking filter based on the beta offset parameter.

Figure 2:
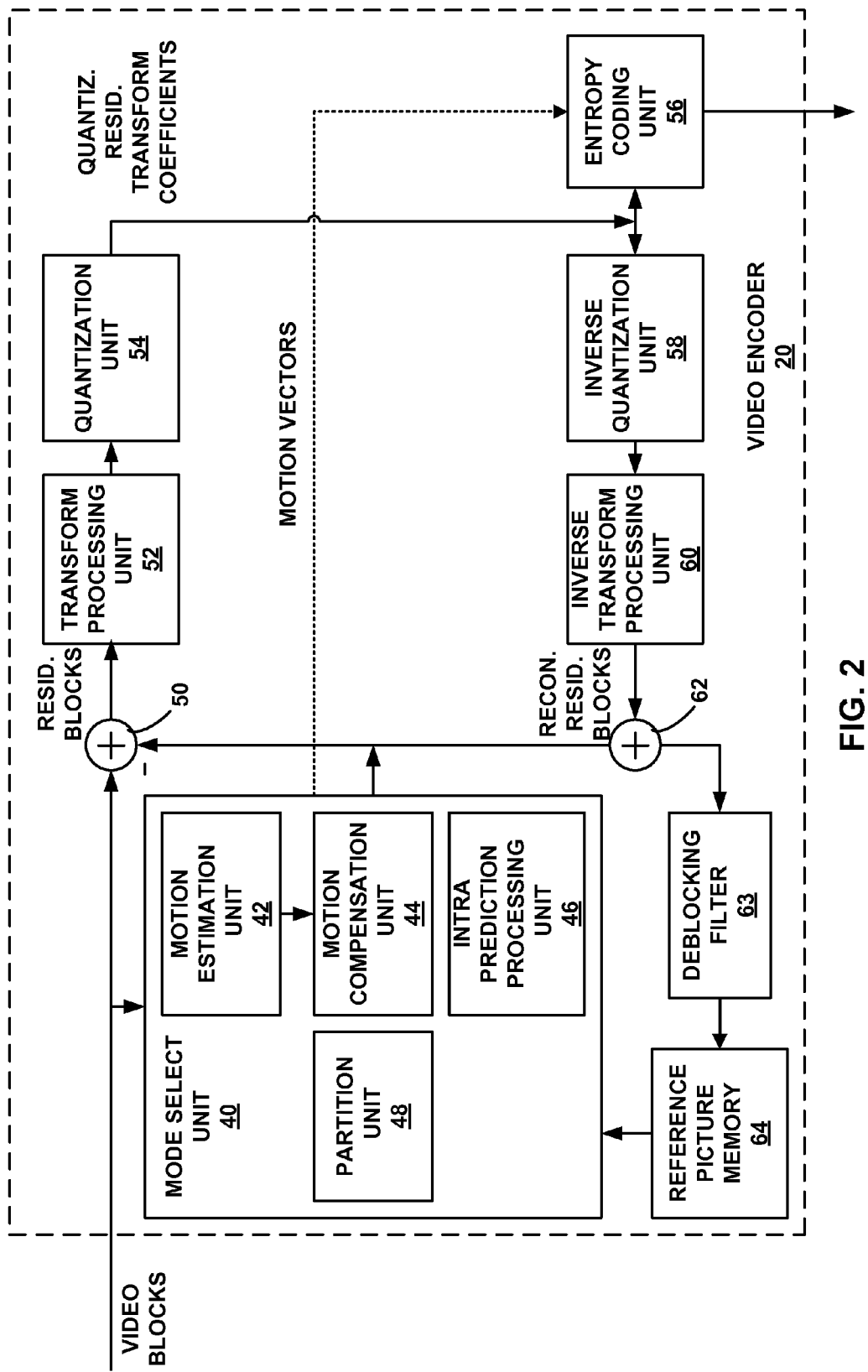
FIG. 2 is a block diagram illustrating an example of a video encoder that may implement the techniques described in this disclosure to control a deblocking filter based on multiplier values of beta offset parameters that modify threshold values of deblocking decisions.

FIG. 2 is a block diagram illustrating an example of video encoder 20 that may implement the techniques described in this disclosure to control a deblocking filter based on multiplier values of beta offset parameters that modify threshold values of deblocking decisions. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra prediction processing unit 46, reference picture memory 64, summer 50, transform processing unit 52, quantization unit 54, and entropy encoding unit 56. For video block reconstruction, video encoder 20 also includes inverse quantization unit 58, inverse transform processing unit 60, and summer 62. A deblocking filter 63 is also included to filter block boundaries to remove blockiness artifacts from reconstructed video.

As shown in FIG. 2, video encoder 20 receives a current video block within a video slice to be encoded. The slice may be divided into multiple video blocks. Mode select unit 40 may select one of the coding modes, intra or inter, for the current video block based on error results. If the intra or inter modes are selected, mode selection unit 40 provides the resulting intra- or inter-coded block to summer 50 to generate residual block data and to summer 62 to reconstruct the encoded block for use as a reference picture. Intra prediction processing unit 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more reference blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU associated with a CU within a current video frame or picture relative to a reference block within a reference picture.

A reference block is a block that is found to closely match the prediction block included in the PU of the CU to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a CU in an inter-coded slice by comparing the position of the PU to the position of a reference block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the reference block based on the motion vector determined by motion estimation. Upon receiving the motion vector for the PU of the current video block, motion compensation unit 44 may locate the reference block to which the motion vector points in one of the reference picture lists. Video encoder 20 forms a residual video block by subtracting pixel values of the reference block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the reference block for the current video block, video encoder 20 forms a residual video block by subtracting the reference block from the current video block. The residual video data in the residual block may be included in transform blocks included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter ("QP") value. In some examples, quantization unit 54 may then perform a scan of the matrix including the quantized transform coefficients. Alternatively, entropy encoding unit 56 may perform the scan.

Following quantization, entropy encoding unit 56 encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain. Summer 62 adds the reconstructed residual block to the reference block produced by motion compensation unit 44 to produce a reconstructed-version of the original video block. The reconstructed video block may be stored for later use as a reference block of a reference picture in reference picture memory 64. The reconstructed video block is then filtered by deblocking filter 63 in order to remove blockiness artifacts at edges of the block. In some cases, video encoder 20 may also apply one or more interpolation filters to the reconstructed video block to calculate sub-integer pixel values of the video block for use as reference blocks. The filtered block is then stored as a reference block of a reference picture in reference picture memory 64. The filtered block may be used by motion estimation unit 42 and motion compensation unit 44 as a reference block to inter-predict a block in a subsequent video frame or picture.

Deblocking filter 63 filters certain edges of the reconstructed video block, including edges of coding blocks, prediction blocks, and transform blocks, based on results from a boundary strength computation and deblocking decisions. For example, deblocking filter 63 calculates functions of the deblocking decisions based on support pixels near a given edge of the reconstructed video block to determine whether and how to deblock the edge. Deblocking filter 63 may alter the values of the pixels near the edge of the video block when a high-frequency change in pixel values is detected at the edge in order to remove perceptible blockiness artifacts.

The boundary strength computation and the deblocking decisions are dependent on deblocking parameter values $t_C$ and $\beta$. In some example, deblocking filter 63 of video encoder 20 may identify each of the deblocking parameter values $t_C$ and $\beta$ based on equations using an index parameter ("Q"). In other examples, deblocking filter 63 of video encoder 20 may identify each of the deblocking parameter values $t_C$ and $\beta$ in a deblocking parameter table, such as Table 1, using an index parameter ("Q"). As shown in Table 1, each value of Q is mapped to a $\beta$ value and a $t_C$ value. Deblocking filter 63 may calculate a separate index parameter to identify each of the deblocking parameter values in Table 1.

TABLE 1

| | Q | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| $\beta$ | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |

| | Q | | | | | | | | | | | | | | | | | | |
|---|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 | 37 |
| $\beta$ | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 1 | 2 | 2 | 2 | 2 | 3 | 3 | 3 | 3 | 4 | 4 |

| | Q | | | | | | | | | | | | | | | |
|---|---|---|---|---|---|---|---|---|---|---|---|---|---|---|---|---|
| | 38 | 39 | 40 | 41 | 42 | 43 | 44 | 45 | 46 | 47 | 48 | 49 | 50 | 51 | 52 | 53 |
| $\beta$ | 38 | 40 | 42 | 44 | 46 | 48 | 50 | 52 | 54 | 56 | 58 | 60 | 62 | 64 | | |
| $t_C$ | 5 | 5 | 6 | 6 | 7 | 8 | 9 | 9 | 10 | 10 | 11 | 11 | 12 | 12 | 13 | 13 |

The index parameter for each of the deblocking parameter values is calculated based at least in part on a quantization parameter ("QP") value for the video block. In the HEVC standard, the index parameter is calculated based on the QP value and an optional deblocking offset parameter, which enables identification of a different deblocking parameter value than the value mapped directly to the QP value alone. As an example, the index parameter for looking up the $\beta$ value ("Q_beta") and the index parameter for looking up the $t_C$ value ("Q_tC") may be calculated as given below in Equations 1 and 2. According to the equations, the Q_beta value is calculated based on a luma QP ("$QP_Y$") value and a beta offset parameter ("beta_offset_div 2"), and the Q_tC value is calculated based on $QP_Y$, boundary strength ("Bs"), and a $t_C$ offset parameter ("tc_offset_div 2").

$$Q\_beta = \text{Clip3}(0, 51, QP_Y + 2 * \text{beta\_offset\_div2}) \qquad \text{EQ. 1}$$

$$Q\_tC = \text{Clip3}(0, 51 + 2, QP_Y + 2 * (Bs - 1) + 2 * \text{tc\_offset\_div2}) \qquad \text{EQ. 2}$$

$$\text{Clip3}(x, y, z) = \begin{cases} x; & z < x \\ y; & z > y \\ z; & \text{otherwise} \end{cases}$$

Deblocking filter 63 calculates the deblocking decisions based on support pixels near a given edge of a reconstructed video block according to threshold values determined based on the identified beta parameter ("$\beta$") value. For example, the deblocking decisions may include an on/off deblocking decision with a threshold value equal to β, a strong/weak deblocking decision with threshold values equal to β/4 and β/8, and a weak filter width deblocking decision with a threshold value equal to 3β/16. Equations for each of the deblocking decision functions are given below. The support pixels are designated in the below equations using the format [p|q]$I_J$, where p corresponds to a block on a first side of the edge, q corresponds to a block on a second side of the edge, I corresponds to a distance from the edge, and J corresponds to a position perpendicular to the edge. The positions of support pixels are illustrated in FIG. 5.

The on/off deblocking decision indicates whether to apply the deblocking filter to the given edge of the video block. The on/off deblocking decision may be calculated based on the following equations.

$$dp_i = |p2_i - 2*p1_i + p0_i|$$

$$dq_i = |q0_i - 2*q1_i + q2_i|, \text{where } i=0 \ldots 7$$

$$d_i = (dp_i + dq_i)$$

If $(d_0+d_3)<\beta$, then the deblocking filter is "on," otherwise the deblocking filter is "off," for the edge segment (i=0 . . . 3) of the video block. If $(d_4+d_7)<\beta$ then the deblocking filter is "on," otherwise the deblocking filter is "off," for the edge segment (i=4 . . . 7) of the video block.

When the deblocking filter is applied to the edge of the video block, the strong/weak deblocking decision indicates whether the deblocking filter is a weak filter or a strong filter. The strong/weak deblocking decision may be calculated based on the following equations.

$$sw_i = 2d_i < \beta/4$$

$$\text{and } (|p3_i - p0_i| + |q0_i - q3_i|) < \beta/8, \text{where } i=0 \ldots 7$$

$$\text{and } |p0_i - q0_i| < ((5*t_C+1)/2)$$

If $sw_0$ and $sw_3$ are both true according to the above equations, then the deblocking filter is a "strong filter," otherwise the deblocking filter is a "weak filter," for the edge segment (i= 0 . . . 3) of the video block. If $sw_4$ and $sw_7$ are both true according to the above equations, then the deblocking filter is a "strong filter," otherwise the deblocking filter is a "weak filter," for the edge segment (i=4 . . . 7) of the video block.

When the deblocking filter applied to the edge of the video block is a weak filter, the weak filter width deblocking decision indicates a number of pixels near the edge of the video block that will be affected by the weak filter. For example, a weak filter applied to the edge of the video block may correct either one or two samples on each side of the edge. The weak filter width deblocking decision may be calculated based on the following equation.

$$(dp_i + dp_{i+3}) < 3\beta/16, \text{where } i=0 \text{ and/or } 4$$

$$(dq_i + dq_{i+3}) < 3\beta/16, \text{where } i=0 \text{ and/or } 4$$

If $(dp_0+dp_3)<3\beta/16$, then the weak deblocking filter will "modify two," otherwise the weak deblocking filter will "modify one," sample on either side of the edge, for the segment (i=0 . . . 3) of the video block. If $(dp_4+dp_7)<3\beta/16$, then the weak deblocking filter will "modify two," otherwise the weak deblocking filter will "modify one," sample on either side of the edge, for the segment (i=4 . . . 7) of the video block.

In the deblocking decision equations presented above, the threshold values for the deblocking decision are determined based on the β value, including β, β/4, β/8, and 3β/16. As described above with respect to Equation 1, the β value is identified based on the QP value and the beta offset parameter. The beta offset parameter provides control of deblocking filter 63 by enabling selection of a β value that is different from the parameter value that is directly mapped to the QP value. In this way, the value of the beta offset parameter results in a change or increment of the beta parameter value ("Δβ") from the β value mapped to given QP value alone.

According to Table 1, for values of Q>27, the β value increases by 2 for each one-step increase in Q value. For example, β=18 is mapped to Q=28, and β=20 is mapped to Q=29. In the case where the beta offset parameter is set equal to 1, beta_offset_div 2=1 and Q=$QP_Y$+2. For a given QP value, therefore, the beta offset parameter results in the Q value increasing by 2 and the β value increasing by 4, such that Δβ=4 for Q>27. For example, for a QP value equal to 28 with a beta offset parameter equal to 1, Q=30 and β=22. The change or increment between β=18 for Q=QP=28 and β=22 for Q=QP+2=30, is Δβ=4.

The threshold values for the deblocking decisions are calculated based on the identified β value using integer arithmetic such that non-integer threshold values will be rounded to the smallest integer value. For example, if β=10 the threshold value β/8 will be rounded to the integer 1, and if β+Δβ=β+ 4=14 the threshold β/8 will still be rounded to the integer 1. In some cases, the integer arithmetic may lead to discontinuous control behavior between the beta offset parameter used to identify the β value and the resulting threshold value. As an example, when the beta offset parameter equal to 1 results in Δβ=4 for Q>27, an integer change may not occur in threshold values β/8 and 3β/16, depending on the initial β value. The threshold value (β+4)/8 will be rounded down to β/8 and the threshold value (3*(β+4))/16 will be rounded down to 3β/16, resulting in no change to the threshold values. Note that, for Q>27, blocking artifacts become visible and control of the deblocking filter is useful for certain video content.

This disclosure describes techniques for providing continuous control of a deblocking filter for a video block using a beta offset parameter. According to the techniques, deblocking filter 63 of video encoder 20 calculates at least one deblocking decision according to a threshold value that has been modified based on a multiplier value of the beta offset parameter. The multiplier value applied to the beta offset parameter is selected to cause an integer change in the modified threshold value for any value of the beta offset parameter and resulting Δβ. The multiplier value comprises an integer value greater than or equal to 1. In some cases, a different multiplier value may be selected for each of the deblocking decisions. In other cases, a single multiplier value may be selected for two or more of the deblocking decisions. Several examples of the techniques used to modify the threshold values for the deblocking decisions are generally described below with respect to deblocking filter 63, and are described in more detail with respect to deblocking filter 91 of video decoder 30 from FIG. 3.

In one example, the threshold value may be directly modified by adding a multiplier value of the beta offset parameter to the original threshold value where the multiplier value of the beta offset parameter causes an integer change in the modified threshold. In this case, the β value may be identified for all the deblocking decisions based on only a luma quantization parameter value, i.e., Q_beta=$QP_Y$. The modified threshold values may be equal to β+A*beta_offset for the on/off deblocking decision, β/8+B*beta_offset for the strong/ weak deblocking decision, and 3β/16+C*beta_offset for the weak filter width deblocking decision, where A, B and C are the multiplier values for the respective deblocking decisions.

In some cases, each of A, B and C may be equal to different values. In other cases, one or more of A, B and C may be equal to the same value. In one example, when the beta offset parameter is equal to 1, and A=4 and B=C=1, the modified threshold values are equal to β+4 for the on/off deblocking decision, β/8+1 for the strong/weak deblocking decision, and 3β/16+1 for the weak filter width deblocking decision. In this way, the multiplier value of the beta offset parameter causes an integer change in the threshold value for any value of the beta offset parameter to provide continuous control of deblocking filter 63 based on the beta offset parameter.

In another example, the threshold value may be indirectly modified by identifying the β value based on the QP value and a multiplier value of the beta offset parameter. In some cases, the multiplier value of the beta offset parameter may be referred to as the beta offset control value. According to the techniques, the beta offset control value is modified to include a multiplier value selected to be large enough to result in a Δβ that causes an integer change in the modified threshold value. In this example, $Q\_beta=QP_Y+N*beta\_offset$, where N is the multiplier value for one or more of the deblocking decisions. When Q is greater than 27, $\Delta\beta=2*N*beta\_offset$. The modified threshold values are then equal to the original threshold values for the deblocking decisions determined using β+Δβ.

Unlike Equation 1 above, the multiplier value is selected according to the threshold values to avoid discontinuous control behavior of deblocking filter 63. In some cases, the multiplier value may be selected to be the same for all the deblocking decisions based on the smallest one of the threshold values, e.g., β/8. In this case, a single β value may be identified to determine the threshold values for all the deblocking decisions. When the beta offset parameter is equal to 1, N=4 results in Δβ=8 and modified threshold values equal to β+8 for the on/off deblocking decision, β/8+1 for the strong/weak deblocking decision, and 3β/16+1 for the weak filter width deblocking decision.

In other cases, different multiplier values may be selected for the deblocking decisions based on the respective threshold values of the deblocking decisions. In this case, different β values are identified to determine the threshold values for the different deblocking decisions. For the on/off deblocking decision, when the beta offset parameter is equal to 1, N=2 results in Δβ=4 and a modified threshold value equal to β+4. In another example, finer control of the on/off deblocking decision may be achieved by setting N=1, resulting in Δβ=2 and a modified threshold value equal to β+2 for the on/off deblocking decision. For the weak/strong deblocking decision, when the beta offset parameter is equal to 1, N=4 results in Δβ=8 and a modified threshold value equal to β/8+1. For the weak/strong deblocking decision, when the beta offset parameter is equal to 1, N=3 results in Δβ=6 and a modified threshold value equal to β/8+1. In either of the above cases, the multiplier value of the beta offset parameter causes an integer change in the threshold value for any value of the beta offset parameter to provide continuous control of deblocking filter 63 based on the beta offset parameter.

In addition to using the deblocking offset parameters to identify the deblocking parameter values for deblocking filter 63, video encoder 20 also signals the deblocking offset parameters to a video decoder, such as video decoder 30. In this way, video decoder 30 may identify the same deblocking parameter values as video encoder 20 in order to define and apply the same or similar deblocking filter to decoded video blocks.

Entropy coding unit 56 of video encoder 20 encodes syntax elements configured to indicate the deblocking offset parameters in one or more of a picture layer parameter set and a slice header for signaling to video decoder 30. As an example, default deblocking offset parameters may be signaled in the PPS, and may be overridden by different deblocking offset parameters signaled in the one or more slice headers of pictures associated with the PPS. The picture layer parameter set may comprise either a picture parameter set (PPS) or an adaptation parameter set (APS). The PPS is a picture layer parameter set that contains data unlikely to change between pictures that refer to the PPS. An APS may be provided in some video coding processes. The APS is a picture layer parameter set intended for use with picture-adaptive data that is likely to change from picture to picture.

According to the techniques of this disclosure, the modified multiplier value applied to the beta offset parameter for one or more of the deblocking decisions is preselected and set at deblocking filter 63 of video encoder 20 and at the deblocking filter of video decoder 30. In this way, entropy coding unit 56 of video encoder 20 does not need to signal the multiplier value to video decoder 30.

The syntax elements defined to indicate the offset parameter values may be named in according with the associated multiplier value. Conventionally, the syntax elements are named beta_offset_div 2 and tc_offset_div 2 because the values are multiplied by 2 when used to calculate the index parameter to identify the deblocking parameter value. According to the techniques of this disclosure, the syntax element used to indicate the beta offset parameter may be renamed to reflect the modified multiplier value. For example, in the case of direct modification of the threshold values, the syntax element may be renamed as beta_offset. In the case of indirect modification of the threshold values, the syntax element may be renamed as beta_offset or beta_offset_div 4. This description generally uses the term beta_offset to refer to the beta offset parameter, but this should not be construed as limiting with respect to the syntax element name used to indicate the beta parameter value.

Figure 3:
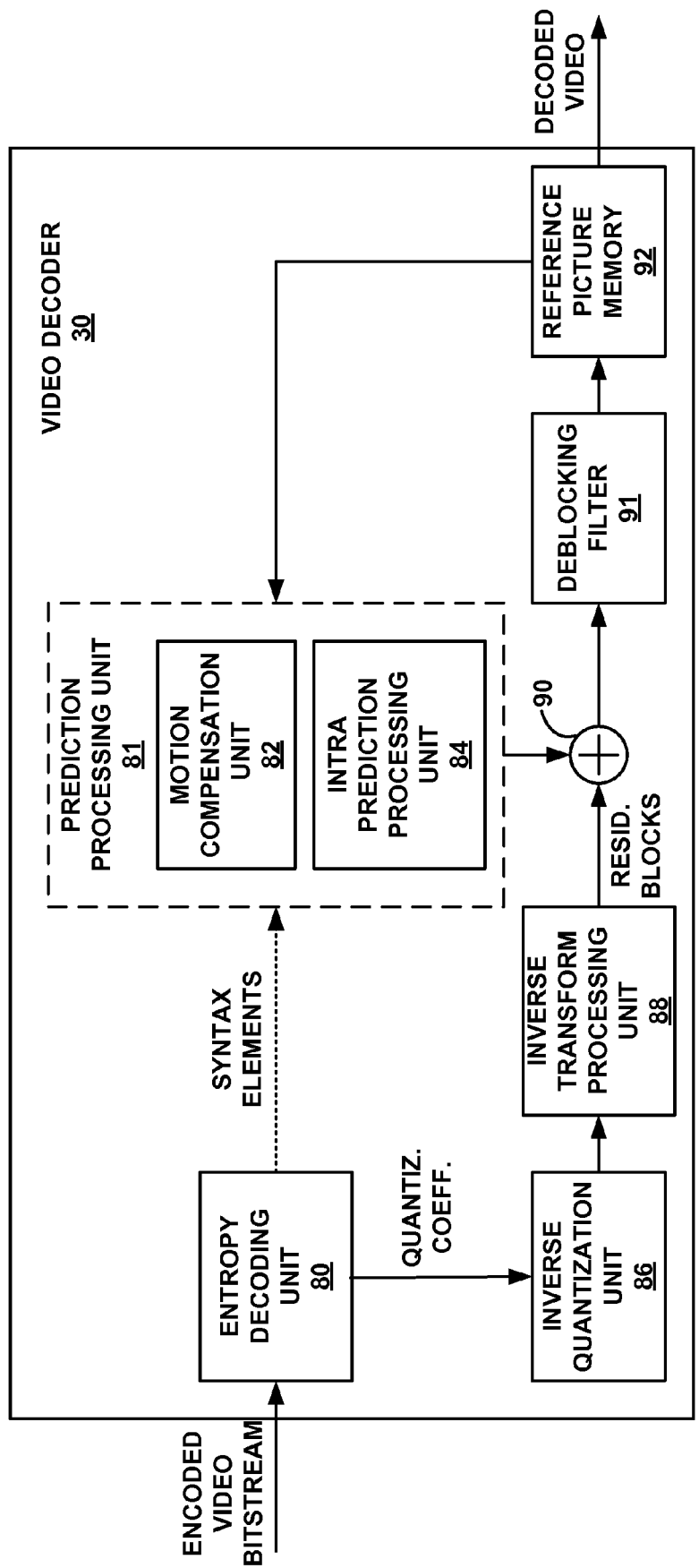
FIG. 3 is a block diagram illustrating an example of a video decoder that may implement the techniques described in this disclosure to control a deblocking filter based on multiplier values of beta offset parameters that modify threshold values of deblocking decisions.

FIG. 3 is a block diagram illustrating an example of a video decoder 30 that may implement the techniques described in this disclosure to control a deblocking filter based on multiplier values of beta offset parameters that modify threshold values of deblocking decisions. In the example of FIG. 3, video decoder 30 includes an entropy decoding unit 80, a prediction processing unit 81, an inverse quantization unit 86, an inverse transform processing unit 88, a summer 90, a deblocking filter 91, and a reference picture memory 92. Prediction processing unit 81 includes motion compensation unit 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at one or more of the sequence level, the picture level, the video slice level and/or the video block level.

When the video slice is coded as an intra-coded (I) slice, intra prediction processing unit 84 may generate reference data for a video block of the current video slice based on a signaled intra prediction mode and data from previously decoded blocks of the current frame or picture. When the video frame is coded as an inter-coded (i.e., B or P) slice, motion compensation unit 82 produces reference blocks for a video block of the current video slice based on the motion vectors and other syntax elements received from entropy decoding unit 80. The reference blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the reference blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce reference blocks.

Inverse quantization unit 86 inverse quantizes, i.e., de-quantizes, the quantized transform coefficients provided in the bitstream and decoded by entropy decoding unit 80. The inverse quantization process may include use of a quantization parameter ("QP") calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the reference block for the current video block based on the motion vectors and other syntax elements, video decoder 30 forms a decoded video block by summing the residual block from inverse transform processing unit 88 with the corresponding reference block generated by motion compensation unit 82. Summer 90 represents the component or components that perform this summation operation. A deblocking filter 91 is applied to filter the decoded video block received from summer 90 in order to remove blockiness artifacts. The decoded video block is then stored in reference picture memory 92, which stores reference blocks of reference pictures used for subsequent motion compensation. Reference picture memory 92, also referred to as a decoded picture buffer (DPB), also stores the decoded video block for later presentation on a display device, such as display device 32 of FIG. 1.

Deblocking filter 91 of video decoder 30 conforms substantially to deblocking filter 63 of video encoder 20 from FIG. 2 in that deblocking filter 91 may be configured to perform any or all of the techniques described with respect to deblocking filter 63. For example, deblocking filter 91 filters certain edges of the decoded video block, including edges of coding blocks, prediction blocks, and transform blocks, based on a result from a boundary strength computation and deblocking decisions. For example, deblocking filter 91 calculates functions of the deblocking decisions based on support pixels near a given edge of the reconstructed video block to determine whether and how to deblock the edge. Deblocking filter 91 may alter the values of the pixels near the edge of the video block when a high-frequency change in pixel values is detected at the edge in order to remove perceptible blockiness artifacts. The deblocking process is described in more detail below with respect to deblocking filter 100 illustrated in FIG. 4.

As described above with respect to deblocking filter 63 of video encoder 20 from FIG. 2, the boundary strength computation and the deblocking decisions are dependent on deblocking parameter values $t_C$ and $\beta$ identified using an index parameter based on either a deblocking parameter table, such as Table 1, or equations. In the HEVC standard, the index parameter is calculated based on the QP value and an optional deblocking offset parameter, which enables identification of a different deblocking parameter value than the value mapped directly to the QP value alone. For example, according to Equation 1 above, the index parameter for looking up the $\beta$ value ("Q_beta") is calculated based on a $QP_Y$ value and a beta offset parameter ("beta_offset_div 2").

The deblocking offset parameters may be signaled to video decoder 30 from a video encoder, such as video encoder 20, as encoded syntax elements in a video bitstream. Upon receiving the video bitstream, entropy decoding unit 80 of video decoder 30 decodes the syntax elements included in the bitstream. The deblocking offset parameter syntax elements indicate the deblocking offset parameters used to control deblocking filter 63 of video encoder 20. Video decoder 30 then uses the same deblocking offset parameters to identify the deblocking parameter values for deblocking filter 91. The syntax elements indicating the deblocking offset parameters may be signaled in one or more of a picture layer parameter set and a slice header. The picture layer parameter set may comprise either a picture parameter set (PPS) or an adaptation parameter set (APS).

Deblocking filter 91 calculates the deblocking decisions based on support pixels near a given edge of a reconstructed video block according to threshold values determined based on the identified beta parameter ("$\beta$") value. The beta offset parameter provides control of deblocking filter 91 by enabling selection of a $\beta$ value that is different from the parameter value that is directly mapped to the QP value. In this way, the value of the beta offset parameter results in a change or increment of the beta parameter value ("$\Delta\beta$") from the $\beta$ value mapped to given QP value alone. For example, according to Table 1, for values of Q>27, the $\beta$ value increases by 2 for each one-step increase in Q value. In the case where the beta offset parameter is set equal to 1, beta_offset_div 2=1 and Q=$QP_Y$+2. For a given QP value, therefore, the beta offset parameter results in the Q value increasing by 2 and the $\beta$ value increasing by 4, such that $\Delta\beta$=4 for Q>27.

The threshold values for the deblocking decisions are calculated based on the identified $\beta$ value. For example, the deblocking decisions may include an on/off deblocking decision with a threshold value equal to $\beta$, a strong/weak deblocking decision with threshold values equal to $\beta$/4 and $\beta$/8, and a weak filter width deblocking decision with a threshold value equal to 3$\beta$/16. As described above with respect to deblocking filter 63 of video encoder 20 from FIG. 2, the threshold values use integer arithmetic such that non-integer threshold values will be rounded to the smallest integer value, which may lead to discontinuous control behavior between the beta offset parameter used to identify the $\beta$ value and the resulting threshold value. As an example, when the beta offset parameter equal to 1 results in $\Delta\beta=4$ for Q>27, an integer change may not occur in threshold values $\beta/8$ and $3\beta/16$, depending on the initial $\beta$ value. Note that, for Q>27, blocking artifacts become visible and control of the deblocking filter is useful for certain video content.

This disclosure describes techniques for providing continuous control of a deblocking filter for a video block using a beta offset parameter. According to the techniques, deblocking filter 91 of video decoder 30 calculates at least one deblocking decision according to a threshold value that has been modified based on a multiplier value of the beta offset parameter. The multiplier value applied to the beta offset parameter is selected to cause an integer change in the modified threshold value for any value of the beta offset parameter and resulting $\Delta\beta$. The multiplier value comprises an integer value greater than or equal to 1. In some cases, a different multiplier value may be selected for each of the deblocking decisions. In other cases, a single multiplier value may be selected for two or more of the deblocking decisions.

In one example, a threshold value for a one or more of the deblocking decisions may be directly modified by adding a multiplier value of the beta offset parameter to the original threshold value where the multiplier value of the beta offset parameter causes an integer change in the modified threshold. In this example, the index parameter used to look up the $\beta$ value is calculated based only on the quantization parameter, i.e., $Q\_beta=QP_Y$. The multiplier value of the beta offset parameter, sometimes referred to as the beta offset control value, is no longer used to identify the $\beta$ value, but is instead used to directly adjust the threshold values for the deblocking decisions.

In general, the directly modified threshold values for the deblocking decisions may be calculated as follows, where A, B and C are the multiplier values for the respective deblocking decisions:

$Q\_beta=Clip3(0,51,QP_Y)$

On/off threshold=$\beta+A$*beta_offset

Strong/weak threshold=$\beta/8+B$*beta_offset

Weak filter width threshold=$3\beta/16+C$*beta_offset

In some cases, A, B and C may be equal to the same value. In other cases, one or more of A, B and C may be equal to a different value. In either case, deblocking filter 91 is able to identify a single $\beta$ value based only on the QP value for all the deblocking decisions of the deblocking filter. In this way, the multiplier values may be individually modified for each of the deblocking decisions without requiring deblocking filter 91 to identify separate $\beta$ values using separate index parameters for the different deblocking decisions.

In one specific example, when the beta offset parameter is equal to 1, multiplier value A=4, and multiplier values B and C=1, the modified threshold values for the deblocking decisions may be calculated as follows.

$Q\_beta=Clip3(0,51,QP_Y)$

On/off threshold=$\beta+4$*beta_offset=$\beta+4$

Strong/weak threshold=$\beta/8$+beta_offset=$\beta/8+1$

Weak filter width threshold=$3\beta/16$+beta_offset=$3\beta/16+1$

As described above with respect to deblocking filter 63 of video encoder 20 from FIG. 2, the syntax elements defined to indicate the offset parameter values may be named in according with the associated multiplier value. According to the techniques of this disclosure, the syntax element used to indicate the beta offset parameter may be renamed to reflect the modified multiplier value. For example, in the case of direct modification of the threshold values, the syntax element may be renamed as beta_offset.

In the above example, the threshold values for the deblocking decisions are directly modified by the multiplier value of the beta offset parameter, known as the beta offset control value. Any integer value of the beta offset control value, therefore, causes an integer change in the threshold value to provide continuous control of deblocking filter 91 based on the beta offset parameter.

In another example, a threshold value for one or more of the deblocking decisions may be indirectly modified by identifying a $\beta$ value using an index parameter based on the QP value and a multiplier value of the beta offset parameter. The multiplier value of the beta offset parameter may be referred to as the beta offset control value. According to the techniques, the beta offset control value is modified to include a multiplier value selected to be large enough to result in a $\Delta\beta$ that causes an integer change in the modified threshold value. The modified beta offset control value, therefore, results in an increased $\Delta\beta$ for the same value of the beta offset parameter. In this way, any value of the beta offset parameter may result in a $\Delta\beta$ capable of changing the threshold values for the deblocking decisions that define the deblocking filter. The techniques, therefore, avoid discontinuous control behavior of the deblocking filter due to small $\Delta\beta$ values.

In this example, $Q\_beta=QP_Y+N$*beta_offset, where N is the multiplier value for one or more of the deblocking decisions. When Q is greater than 27, $\Delta\beta=2$*N*beta_offset. The modified threshold values are then equal to the original threshold values for the deblocking decisions determined using $\beta+\Delta\beta$. Unlike Equation 1 above, where N=2, the techniques include selecting the multiplier value according to the threshold values to avoid discontinuous control behavior of deblocking filter 91.

In a first case, separate beta parameter values may be identified based on different multiplier values of the beta offset parameter for the different deblocking decisions. The different multiplier values may be selected for the different deblocking decisions based on the respective threshold values of the deblocking decisions. In this case, deblocking filter 91 will calculate separate index parameters, i.e., Q_onoff, Q_strong_weak, and Q_weak_width, to identify separate $\beta$ values for the different deblocking decisions.

For the on/off deblocking decision with an original threshold value equal to $\beta$, the multiplier value may be selected to be equal to any integer value greater than or equal to 1 because any resulting $\Delta\beta$ will cause an integer change in the threshold value. In the case where the multiplier value for the on/off deblocking decision is set equal to 2, the modified threshold value for the on/off deblocking decision may be calculated as follows.

$Q\_onoff=Clip3(0,51,QP_Y+2$*beta_offset)

$\Delta\beta=4$*beta_offset for Q>27

On/off threshold=$\beta+\Delta\beta=\beta+4$*beta_offset

When the beta offset parameter is equal to 1, $\Delta\beta=4$ for Q>27 and the modified threshold value for the on/off deblocking decision is equal to $\beta+4$.

In the case where the multiplier value for the on/off deblocking decision is set equal to 1, the multiplier value of the beta offset parameter results in a smaller $\Delta\beta$ to give deblocking filter 91 finer control of the on/off deblocking decision. The modified threshold value for the on/off deblocking decision may be calculated as follows:

$$Q\_onoff=Clip3(0,51,QP_Y+beta\_offset)$$

$$\Delta\beta=2*beta\_offset \text{ for } Q>27$$

$$\text{On/off threshold}=\beta+\Delta\beta=\beta+2*beta\_offset$$

When the beta offset parameter is equal to 1, $\Delta\beta=2$ for Q>27 and the modified threshold value for the on/off deblocking decision is equal to $\beta+2$.

For the strong/weak deblocking decision with a smallest original threshold value equal to $\beta/8$, the multiplier value may be selected to be equal to any integer value greater than or equal to 4 in order to result in a $\Delta\beta$ large enough to cause an integer change in the threshold value. In the case where the multiplier value for the strong/weak deblocking decision is set equal to 4, the modified threshold value for the strong/weak deblocking decision may be calculated as follows:

$$Q\_strong\_weak=Clip3(0,51,QP_Y+4*beta\_offset)$$

$$\Delta\beta=8*beta\_offset \text{ for } Q>27$$

$$\text{Strong/weak threshold}=(\beta+\Delta\beta)/8=\beta/8+beta\_offset$$

When the beta offset parameter is equal to 1, $\Delta\beta=8$ for Q>27 and the modified threshold value for the strong/weak deblocking decision is equal to $\beta/8+1$.

For the weak filter width deblocking decision with an original threshold value equal to $3\beta/16$, the multiplier value may be selected to be equal to any integer value greater than or equal to 3 in order to result in a $\Delta\beta$ large enough to cause an integer change in the threshold value. In the case where the multiplier value for the weak filter width deblocking decision is set equal to 3, the modified threshold value for the weak filter width deblocking decision may be calculated as follows:

$$Q\_weak\_width=Clip3(0,51,QP_Y+3*beta\_offset)$$

$$\Delta\beta=6*beta\_offset \text{ for } Q>27$$

$$\text{Strong/weak threshold}=(3*(\beta+\Delta\beta))/16\approx3\beta/16+beta\_offset$$

When the beta offset parameter is equal to 1, $\Delta\beta=6$ for Q>27 and the modified threshold value for the weak filter width deblocking decision is equal to $3\beta/16+1$. In the above examples, the beta offset parameter syntax element may be renamed beta_offset.

In a second case, a single beta parameter value may be identified based on a single multiplier value of the beta offset parameter for all of the different deblocking decisions. The single multiplier value may be selected for the different deblocking decisions based on a smallest threshold value for the deblocking decisions. In this case, deblocking filter 91 will calculate a single index parameter, i.e., Q_beta, to identify a single $\beta$ value for all of the different deblocking decisions.

Given the on/off deblocking decision with an original threshold value equal to $\beta$, the strong/weak deblocking decision with an original threshold value equal to $\beta/8$, and the weak filter width deblocking decision with an original threshold value equal to $3\beta/16$, the smallest threshold value is equal to $\beta/8$. The single multiplier value may be selected to be equal to any integer value greater than or equal to 4 in order to result in a $\Delta\beta$ large enough to cause an integer change in the threshold value $\beta/8$.

In the case where the multiplier value for the deblocking decisions is set equal to 4, the modified threshold values for the deblocking decisions may be calculated as follows:

$$Q\_beta=Clip3(0,51,QP_Y+4*beta\_offset\_div 4)$$

$$\Delta\beta=8*beta\_offset\_div 4 \text{ for } Q>27$$

$$\text{On/off threshold}=\beta+\Delta\beta=\beta+8*beta\_offset\_div 4$$

$$\text{Strong/weak threshold}=(\beta+\Delta\beta)/8=\beta/8+beta\_offset\_div 4$$

$$\text{Weak filter width threshold}=3(\beta+\Delta\beta)/16\approx(3\beta/16)+beta\_offset\_div 4$$

When the beta offset parameter is equal to 1, $\Delta\beta=8$ for Q>27 and the modified threshold value for the on/off deblocking decision is equal to $\beta+8$. In this case, the multiplier value results in a larger $\Delta\beta$, which gives deblocking filter 91 courser control of the on/off deblocking decision and causes the on/off deblocking decision to make larger jumps for a given beta parameter value. In addition, for the beta offset parameter equal to 1 and $\Delta\beta=8$, the modified threshold value for the strong/weak deblocking decision is equal to $\beta/8+1$, and the modified threshold value for the weak filter width deblocking decisions is equal to $3\beta/16+1$. In this example, the beta offset parameter syntax element may be renamed beta_offset_div 4 based on the multiplier value equal to 4 for all the deblocking decisions.

As described above with respect to deblocking filter 63 of video encoder 20 from FIG. 2, the syntax elements defined to indicate the offset parameter values may be named in according with the associated multiplier value. According to the techniques of this disclosure, the syntax element used to indicate the beta offset parameter may be renamed to reflect the modified multiplier value. For example, in the case of indirect modification of the threshold values, the syntax element may be renamed as beta_offset or beta_offset_div 4. This description generally uses the term beta_offset to refer to the beta offset parameter, but this should not be construed as limiting with respect to the syntax element name used to indicate the beta parameter value.

In the above example, the threshold values for the deblocking decisions are indirectly modified by identifying a $\beta$ value using an index parameter based on the QP value and a multiplier value of the beta offset parameter, known as the beta offset control value. The beta offset control value includes a multiplier value selected to result in a $\Delta\beta$ that causes an integer change in the modified threshold value to provide continuous control of deblocking filter 91 based any value of the beta offset parameter.

Figure 4:
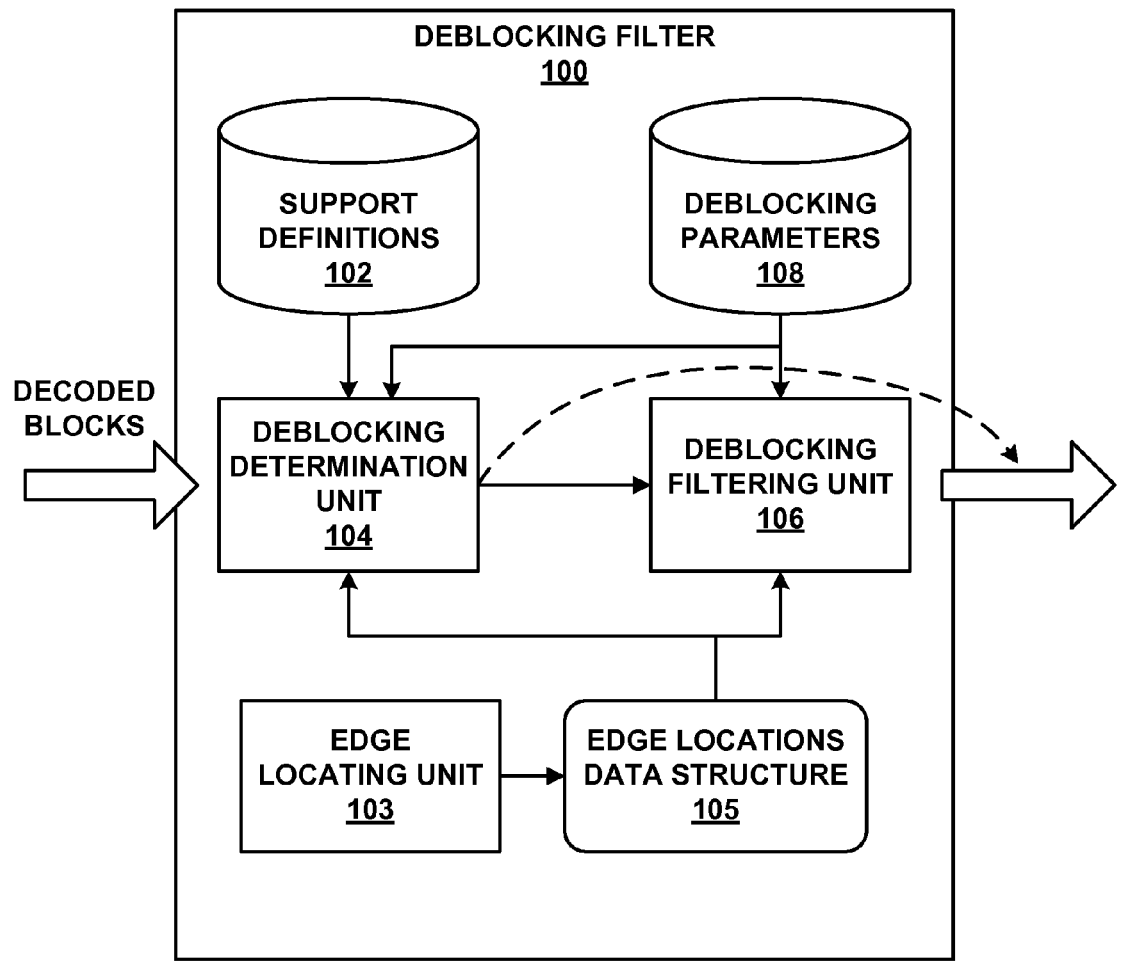
FIG. 4 is a block diagram illustrating components of an example deblocking filter.

FIG. 4 is a block diagram illustrating components of an example deblocking filter 100. In general, either or both of deblocking filter 63 from FIG. 2 and deblocking filter 91 from FIG. 3 may include components that are identical or substantially similar to those of deblocking filter 100. Other video coding devices, such as video encoders, video decoders, video encoder/decoders (CODECs), and the like may also include components substantially similar to deblocking filter 100. Deblocking filter 100 may be implemented in hardware, software, or firmware, or any combination thereof. When implemented in software or firmware, corresponding hardware (such as one or more processors or processing units and memory for storing instructions for the software or firmware) may also be provided.

In the example of FIG. 4, deblocking filter 100 includes deblocking determination unit 104, support definitions 102 stored in memory, deblocking filtering unit 106, deblocking parameters 108 stored in memory, edge locating unit 103, and edge locations data structure 105. Any or all of the components of deblocking filter 100 may be functionally integrated. The components of deblocking filter 100 are illustrated separately only for purposes of illustration. In general, deblocking filter 100 receives data for decoded blocks, e.g., from a summation component that combines reference data with residual data for the blocks. The data may further include an indication of how the blocks were predicted. In the example described below, deblocking filter 100 is configured to receive data including a decoded video block associated with a CTU or CU, and partitioning data for the CTU or CU.

Deblocking filter 100 may maintain edge locations data structure 105 in a memory of deblocking filter 100, or in an external memory provided by a corresponding video coding device. In some examples, edge locating unit 103 may receive partitioning data for a CTU in the form of a CU quadtree that indicates how the CTU is partitioned into CUs. In other examples, edge locating unit 103 may receive partitioning data for a CU that indicates how the CU is partitioned in PUs and TUs. Edge locating unit 103 may then analyze the partitioning data to determine edges between decoded video blocks associated with CUs, PUs and TUs that are candidates for deblocking.

Edge locations data structure 105 may comprise an array having a horizontal dimension, a vertical dimension, and a dimension representative of horizontal edges and vertical edges. In general, edges between video blocks may occur between two coding blocks associated with smallest-sized CUs of the CTU, or between prediction blocks associated with PUs of the CUs and transform blocks associated with TUs of the CUs. For example, assuming that the CTU has a size of N×N, and assuming that the smallest-sized CU of the CTU is of size M×M, the array may comprise a size of [N/M]×[N/M]×2, where 2 represents the two possible directions of edges between CUs (horizontal and vertical). In the example of a CTU having 64×64 pixels and a 8×8 smallest-sized CU, the array may comprise [8]×[8]×[2] entries. Each of the entries may generally correspond to a possible edge between two coding blocks. In other examples, edge locations data structure 105 may include additional entries in the array or separate arrays that indicate possible edges between prediction blocks and transform blocks.

Edges might not in fact exist at each of the positions within the CTU corresponding to each of the entries of edge locations data structure 105. Accordingly, values of the data structure may be initialized to false. In general, edge locating unit 103 may analyze the partition data to determine locations of edges between two video blocks associated CUs of the CTU, PUs of the CUs, and TUs of CUs and set corresponding values in edge locations data structure 105 to true. In general, the entries of the array may describe whether a corresponding edge exists in the CTU as a candidate for deblocking. That is, when edge locating unit 103 determines that an edge between two neighboring video blocks associated CUs of the CTU, PUs of the CUs, or TUs of the CUs exists, edge locating unit 103 may set a value of the corresponding entry in edge locations data structure 105 to indicate that the edge exists (e.g., to a value of "true").

Deblocking determination unit 104 generally determines whether, for two neighboring blocks, an edge between the two blocks should be deblocked. Deblocking determination unit 104 may determine locations of edges using edge locations data structure 105. When a value of edge locations data structure 105 has a Boolean value, deblocking determination unit 104 may determine that a "true" value indicates the presence of an edge, and a "false" value indicates that no edge is present, in some examples.

In general, deblocking determination unit 104 is configured with one or more deblocking decision functions to calculate one or more of an on/off deblocking decision, a strong/weak deblocking decision, and a weak filter width deblocking decision that define the operation of deblocking filtering unit 106. The functions may include a plurality of coefficients applied to lines of pixels that cross the edge between the blocks. For example, the functions may be applied to a line of eight pixels that is perpendicular to the edge, where four of the pixels are in one of the two blocks and the other four pixels are in the other of the two blocks. Support definitions 102 define support for the functions. In general, the "support" corresponds to the pixels to which the functions are applied. Various examples of sets of support are described in greater detail below with respect to FIG. 5.

Deblocking determination unit 104 may be configured to apply one or more deblocking decision functions to one or more sets of support, as defined by support definitions 102, and compare the results of the functions to threshold values, as defined by deblocking parameters 108. In this way, deblocking determining unit 104 may first calculate the on/off deblocking decision to determine whether a particular edge between two blocks of video data should be deblocked. The dashed line originating from deblocking determination unit 104 represents data for blocks being output without being filtered. In cases where deblocking determination unit 104 determines that an edge between two blocks should not be filtered, deblocking filter 100 may output the data for the blocks without altering the data. That is, the data may bypass deblocking filtering unit 106.

When deblocking determination unit 104 determines that an edge should be deblocked, deblocking determination unit 104 may cause deblocking filtering unit 106 to filter values for pixels near the edge in order to deblock the edge. Deblocking filtering unit 106 retrieves definitions of deblocking filters to filter the pixels near the edge from deblocking determination unit 104 and deblocking parameters 108. Deblocking determination unit 104 may calculate the strong/weak and weak filter width deblocking decisions based on support pixels defined in support definitions 102 and threshold values defined by deblocking parameters 108.

In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 106 may smooth the values of the pixels such that high frequency transitions near the edge are dampened. In this manner, application of deblocking filters to pixels near an edge may reduce blockiness artifacts near the edge.

FIG. 5 is a conceptual diagram illustrating pixel positions near an edge 124 between two video blocks 120 and 122. In some examples, edge 124 may comprise an inner CU edge such as a TU edge between two transform blocks of TUs defined in the CU, or a PU edge between two prediction blocks of PUs defined in the CU. In other examples, edge 124 may comprise an outer CU edge between two coding blocks of CUs included in a CTU. Each of the pixel positions is designated using the format $[p|q]I_J$, where p corresponds to block 120 and q corresponds to block 122, I corresponds to a distance from edge 124, and J corresponds to a row indicator from top to bottom of blocks 120 and 122.

In some examples, the number of pixels selected for the set of support pixels used for deblocking decision functions and deblocking filters corresponds to the smallest block for deblocking, e.g., 8×8 pixels. In this manner, the line of pixels used for support, e.g., a line of 8 pixels, stretches across an edge between two blocks with pixels on either side of the edge, e.g., to the left and right of an edge or above and below an edge. In the case of vertical edge 124 illustrated in FIG. 5, the support pixels may include four pixels to the left and four pixels to the right of edge 124 along a common line. In this example, for a given line X where 0≤X≤7, each of pixels $p3_x$ to $q3_x$ may be used as support.

Figure 6:
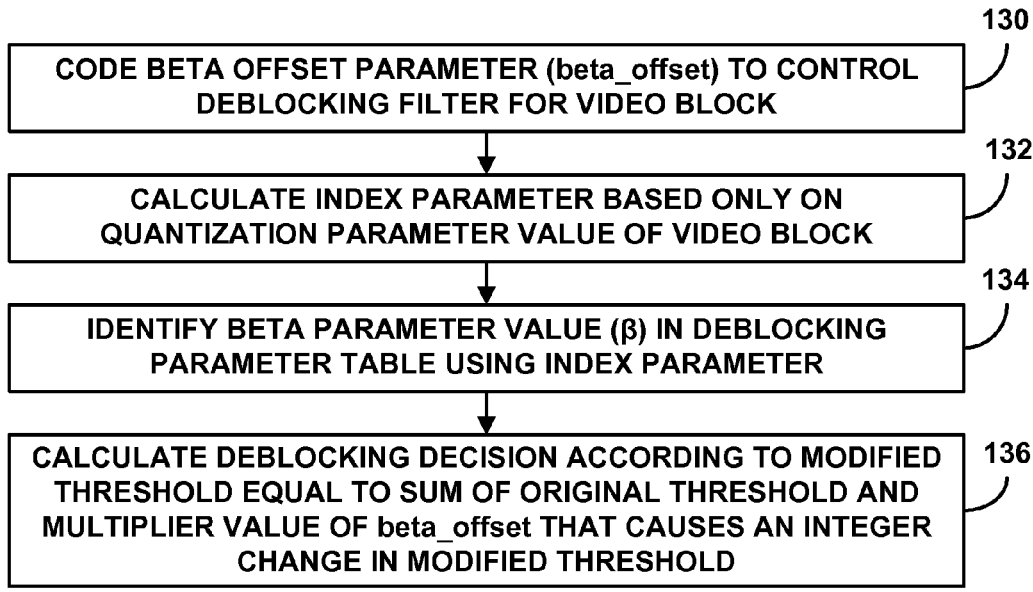
FIG. 6 is a flowchart illustrating an example operation of calculating a deblocking decision for a deblocking filter for a video block according to a threshold value directly modified based on a multiplier value of a beta offset parameter, in accordance with an example of the techniques described in this disclosure.

FIG. 6 is a flowchart illustrating an example operation of calculating a deblocking decision for a deblocking filter for a video block according to a threshold value directly modified based on a multiplier value of a beta offset parameter, in accordance with the techniques described in this disclosure. In this example operation, the modified threshold value for a certain deblocking decision is equal to a sum of an original threshold value for the deblocking decision and the multiplier value of the beta offset parameter that causes an integer change in the modified threshold value. The operation illustrated in FIG. 6 is described with respect to deblocking filter 91 of video decoder 30 from FIG. 3. In other examples, deblocking filter 63 of video decoder 20 may perform a similar operation.

Video decoder 30 receives a video bitstream from a video encoder, such as video encoder 20, that includes encoded video blocks and encoded syntax elements that indicate coding information associated with the video blocks. The video bitstream may include syntax elements defined to indicate deblocking offset parameters in one or more of a slice header and a picture layer parameter set. Upon receipt of the video bitstream, entropy decoding unit 80 decodes the syntax element indicating a beta offset parameter, e.g., beta_offset, used to control deblocking filter 91 for a given decoded video block (130).

Deblocking filter 91 of video decoder 30 calculates an index parameter ("Q_beta") based only on a quantization parameter ("QP") value of the decoded video block (132). Deblocking filter 91 then identifies a beta parameter ("β") value in a deblocking parameter table, such as Table 1 given above, using the index parameter (134). Deblocking parameter 91 calculates a deblocking decision according to a modified threshold value equal to a sum of an original threshold value for the deblocking decision and a multiplier value of the beta offset parameter, where the multiplier value of the beta offset parameter causes an integer change in the modified threshold value (136).

In this way, the threshold value for the deblocking decision is directly modified by the multiplier value of the beta offset parameter, known as the beta offset control value. Any integer value of the beta offset control value, therefore, causes an integer change in the threshold value to provide continuous control of deblocking filter 91 based on the beta offset parameter.

Figure 7:
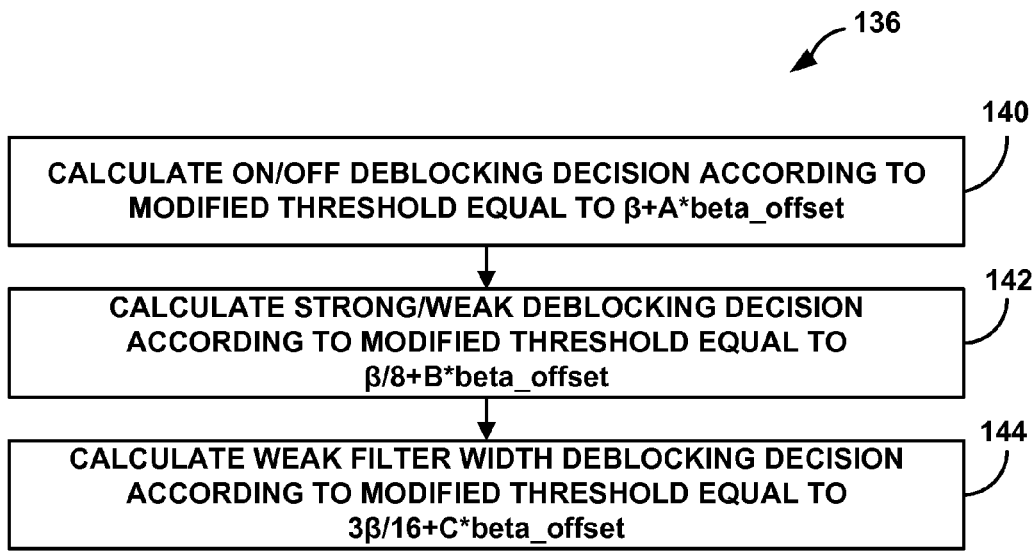
FIG. 7 is a flowchart illustrating an example of calculating different deblocking decisions for the deblocking filter according to modified threshold values in the operation illustrated in FIG. 6.

FIG. 7 is a flowchart illustrating an example of calculating different deblocking decisions for the deblocking filter according to modified threshold values in the operation illustrated in FIG. 6. The operation illustrated in FIG. 7 is described with respect to deblocking filter 91 of video decoder 30 from FIG. 3. In other examples, deblocking filter 63 of video decoder 20 may perform a similar operation.

As described above with respect to step 136 of FIG. 6, deblocking parameter 91 calculates a deblocking decision according to a modified threshold value equal to a sum of an original threshold value for the deblocking decision and a multiplier value of a beta offset parameter that causes an integer change in the modified threshold value. For a given edge of a decoded video block, deblocking filter 91 may calculate an on/off deblocking decision to determine whether to deblock the edge, and deblocking filter 91 may further calculate a weak/strong deblocking decision and a weak filter width deblocking decision to determine a type and width of the filter to deblock the edge.

Deblocking filter 91 calculates the on/off deblocking decision for the given edge of the decoded video block according to a modified threshold value equal to $\beta+A*beta\_offset$, where A is an integer multiplier value greater than or equal to 1 (140). When the filter is turned on for the edge of the decoded video block, deblocking filter 91 then calculates a strong/weak deblocking decision according to a modified threshold value equal to $\beta/8+B*beta\_offset$, where B is an integer multiplier value greater than or equal to 1 (142). When the filter applied to the edge of the decoded video block is a weak filter, deblocking filter 91 calculates a weak filter width deblocking decision according to a modified threshold value equal to $3\beta/16+C*beta\_offset$, where C is an integer multiplier value greater than or equal to 1 (144).

In some examples, multiplier values A, B and C may each be equal to a different integer value. In other examples, two or more of multiplier values A, B and C may have the same value. In one specific example, when the beta offset parameter is equal to 1, multiplier value A=4, and multiplier values B and C=1, the modified threshold value for the on/off deblocking decision is equal to $\beta+4$, the modified threshold value for the strong/weak deblocking decision is equal to $\beta/8+1$, and the modified threshold value for the weak filter width threshold equal to $3\beta/16+1$.

Figure 8:
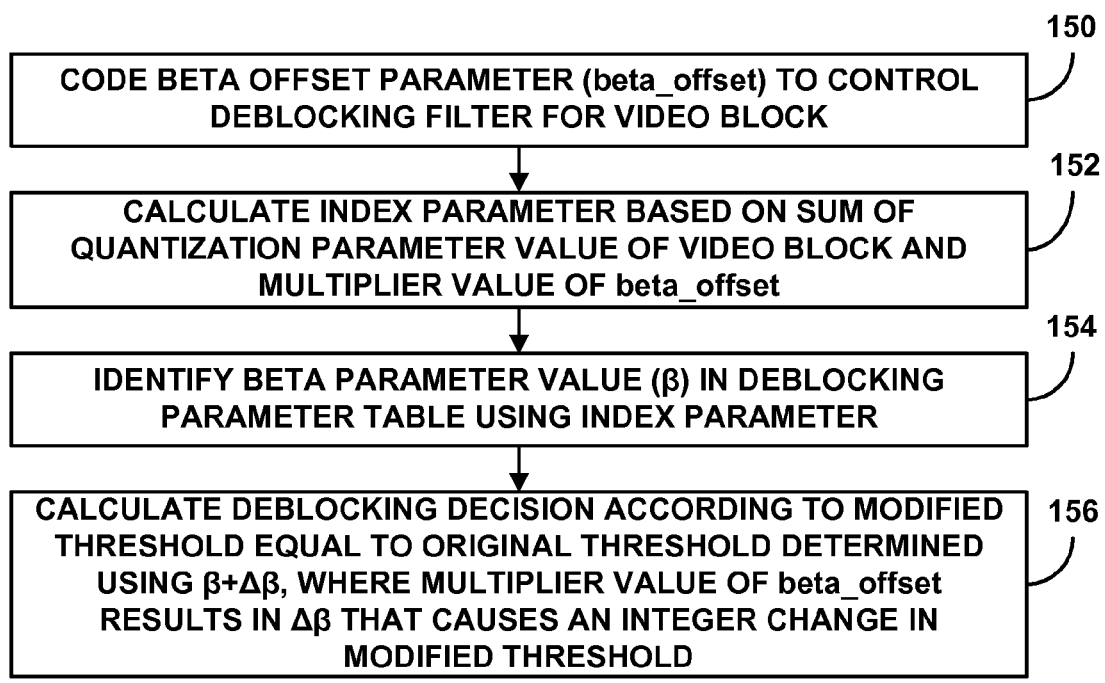
FIG. 8 is a flowchart illustrating an example operation of calculating a deblocking decision for a deblocking filter for a video block according to a threshold value indirectly modified based on a multiplier value of a beta offset parameter, in accordance with an example of the techniques described in this disclosure.

FIG. 8 is a flowchart illustrating an example operation of calculating a deblocking decision for a deblocking filter for a video block according to a threshold value indirectly modified based on a multiplier value of a beta offset parameter, in accordance with the techniques described in this disclosure. In this example operation, the multiplier value of the beta offset parameter is used to identify a beta parameter value and results in an increment of the beta parameter value that causes an integer change in the modified threshold value. The operation illustrated in FIG. 8 is described with respect to deblocking filter 91 of video decoder 30 from FIG. 3. In other examples, deblocking filter 63 of video decoder 20 may perform a similar operation.

Video decoder 30 receives a video bitstream from a video encoder, such as video encoder 20, that includes encoded video blocks and encoded syntax elements that indicate coding information associated with the video blocks. The video bitstream may include syntax elements defined to indicate deblocking offset parameters in one or more of a slice header and a picture layer parameter set. Upon receipt of the video bitstream, entropy decoding unit 80 decodes the syntax element indicating a beta offset parameter, e.g., beta_offset, used to control deblocking filter 91 for a given decoded video block (150).

Deblocking filter 91 of video decoder 30 calculates an index parameter ("Q_beta") based on a sum of a quantization parameter ("QP") value of the decoded video block and a multiplier value of the beta offset parameter (152). Deblocking filter 91 then identifies a beta parameter ("β") value in a deblocking parameter table, such as Table 1 given above, using the index parameter (154). The multiplier value applied to the beta offset parameter is selected according to an original threshold value for the deblocking decision and results in a given increment of the beta parameter value ("Δβ"). Deblocking filter 91 calculates a deblocking decision according to a modified threshold value equal to an original threshold value for the deblocking decision determined using $\beta+\Delta\beta$, where the multiplier value of the beta offset parameter results in a $\Delta\beta$ that causes an integer change in the modified threshold value (156).

In this way, the threshold value for the deblocking decision is indirectly modified by identifying the $\beta$ value based on the QP value and the multiplier value of the beta offset parameter, known as the beta offset control value. The beta offset control value is modified to include a multiplier value that is large enough to result in a $\Delta\beta$ that causes an integer change in the modified threshold value in order to provide continuous control of deblocking filter 91 based on any value of the beta offset parameter.

Figure 9:
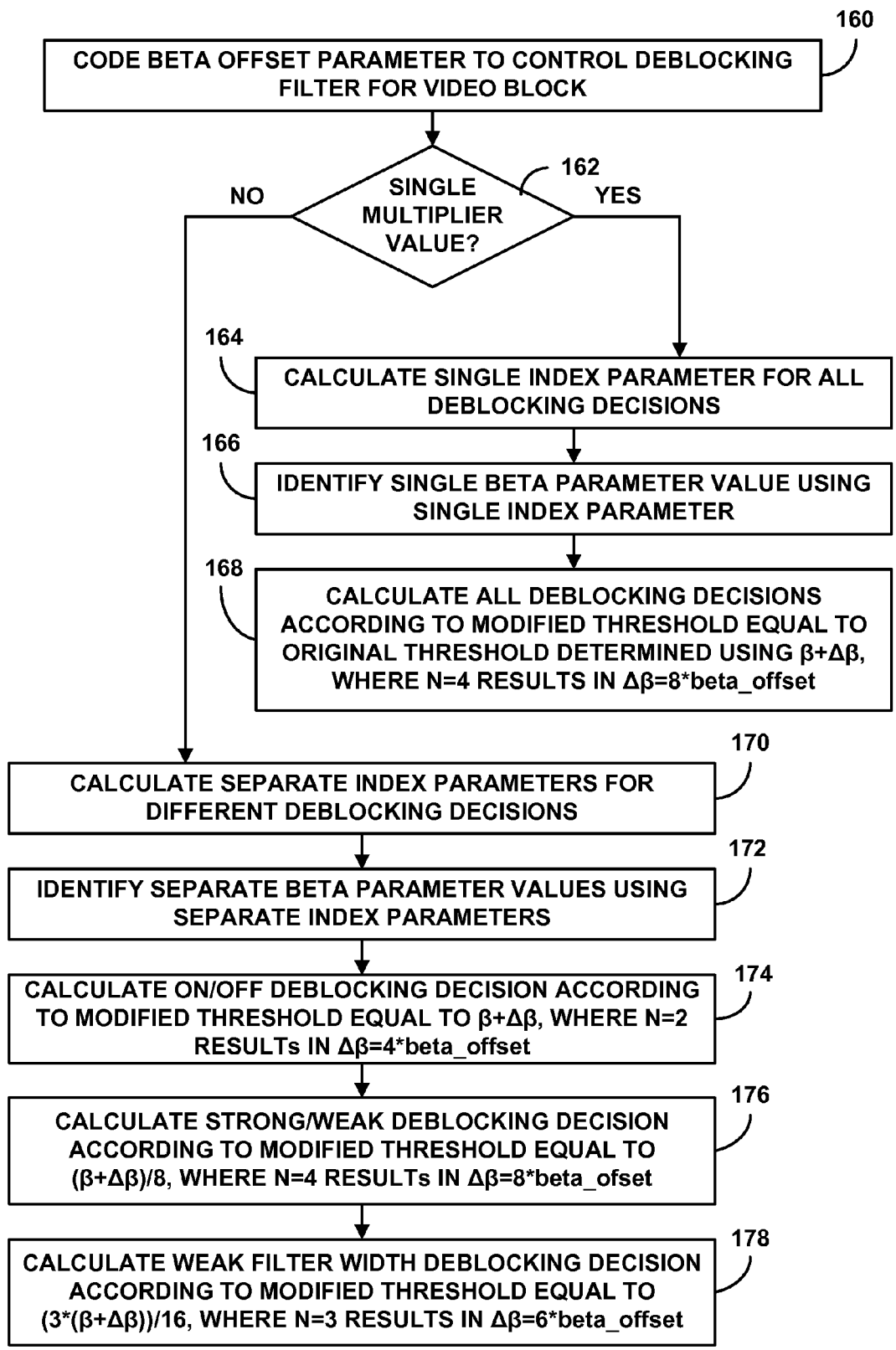
FIG. 9 is a flowchart illustrating an example operation of calculating different deblocking decisions for a deblocking filter for a video block based on threshold values indirectly modified based on multiplier values of beta offset parameters, in accordance with an example of the techniques described in this disclosure.

FIG. 9 is a flowchart illustrating an example operation of calculating different deblocking decisions for a deblocking filter for a video block based on threshold values indirectly modified based on multiplier values of a beta offset parameter, in accordance with the techniques described in this disclosure. The operation illustrated in FIG. 9 is described with respect to deblocking filter 91 of video decoder 30 from FIG. 3. In other examples, deblocking filter 63 of video decoder 20 may perform a similar operation.

In this example operation, for each of the deblocking decisions, a multiplier value of the beta offset parameter is used to identify a beta parameter value and results in an increment of the beta parameter value that causes an integer change in the modified threshold value for the deblocking decision. In some cases, a single multiplier value may be selected for all the deblocking decisions based on a smallest one of the original threshold values for the deblocking decisions. In other cases, different multiplier values may be selected for the deblocking decisions based on the respective original threshold values of the deblocking decisions.

Video decoder 30 receives a video bitstream from a video encoder, such as video encoder 20, that includes encoded video blocks and encoded syntax elements that indicate coding information associated with the video blocks. The video bitstream may include syntax elements defined to indicate deblocking offset parameters in one or more of a slice header and a picture layer parameter set. Upon receipt of the video bitstream, entropy decoding unit 80 decodes the syntax element indicating a beta offset parameter ("beta_offset") used to control deblocking filter 91 for a given decoded video block (160).

If a single multiplier value is used for all the deblocking decisions (YES branch of 162), deblocking filter 91 calculates a single index parameter ("Q_beta") for all the deblocking decisions (164). Deblocking filter 91 then identifies a single beta parameter ("$\beta$") value using the single index parameter (166). The single multiplier value applied to the beta offset parameter may be selected according to the smallest original threshold value for the deblocking decisions and results in a given increment of the beta parameter value ("$\Delta\beta$"). Given the on/off deblocking decision, the strong/weak deblocking decision, and the weak filter width deblocking decision, the smallest threshold value is equal to $\beta/8$. The single multiplier value ("N") may be selected to be equal to any integer value greater than or equal to 4 in order to result in a $\Delta\beta$ large enough to cause an integer change in the threshold value $\beta/8$.

Deblocking filter 91 calculates all the deblocking decisions according to modified threshold values equal to the original threshold values for the deblocking decisions determined using $\beta+\Delta\beta$, where the multiplier value for the deblocking decisions set equal to 4 results in $\Delta\beta=8*\text{beta\_offset}$ for Q>27 (168). In this example, when beta_offset=1, the modified threshold value for the on/off deblocking decisions is equal to $\beta+8$, the modified threshold value for the strong/weak deblocking decision is equal to $\beta/8+1$, and the modified threshold value for the weak filter width deblocking decisions is equal to $3\beta/16+1$.

If a different multiplier value is used for each of the deblocking decisions (NO branch of 162), deblocking filter 91 calculates separate index parameters ("Q_onoff," "Q_strong_weak," and "Q_weak_width") for the different deblocking decisions (170). Deblocking filter 91 then identifies separate beta parameter ("$\beta$") values using the separate index parameters (172). The different multiplier values applied to the beta offset parameter may be selected for the different deblocking decisions based on the respective original threshold values for the deblocking decisions and result in different increments of the beta parameter value ("$\Delta\beta$").

For the on/off deblocking decision with an original threshold value equal to $\beta$, the multiplier value may be selected to be equal to any integer value greater than or equal to 1 because any resulting $\Delta\beta$ will cause an integer change in the threshold value. Deblocking filter 91 calculates the on/off deblocking decision according to a modified threshold value equal to $\beta+\Delta\beta$, where the multiplier value set equal to 2 results in $\Delta\beta=4*\text{beta\_offset}$ for Q>27 (174).

For the strong/weak deblocking decision with a smallest original threshold value equal to $\beta/8$, the multiplier value may be selected to be equal to any integer value greater than or equal to 4 in order to result in a $\Delta\beta$ large enough to cause an integer change in the threshold value. Deblocking filter 91 calculates the strong/weak deblocking decision according to a modified threshold equal to $(\beta+\Delta\beta)/8$, where the multiplier value set equal to 4 results in $\Delta\beta=8*\text{beta\_offset}$ (176).

For the weak filter width deblocking decision with an original threshold value equal to $3\beta/16$, the multiplier value may be selected to be equal to any integer value greater than or equal to 3 in order to result in a $\Delta\beta$ large enough to cause an integer change in the threshold value. Deblocking filter 91 calculates the weak filter width deblocking decision according to a modified threshold value equal to $(3*(\beta+\Delta\beta))/16$, where the multiplier value set equal to 3 results in $\Delta\beta=6*\text{beta\_offset}$ (178).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a beta offset parameter ("beta_offset") that controls a deblocking filter for a video block;
    identifying a beta parameter ("β") value used to determine an original threshold value of each of a plurality of deblocking decisions for the deblocking filter;
    determining a modified threshold value of each of the plurality of deblocking decisions for the deblocking filter based on the beta offset parameter; and
    calculating each of the plurality of deblocking decisions for the deblocking filter according to the modified threshold value of the respective deblocking decision, wherein the modified threshold value is modified from the original threshold value of the respective deblocking decision based on a multiplier value of the beta offset parameter selected to cause an integer change in the modified threshold value, wherein the multiplier value comprises an integer, and wherein:
    determining the modified threshold value comprises:
        determining that the modified threshold value of the respective deblocking decision is equal to a sum of the original threshold value of the respective deblocking decision and the multiplier value of the beta offset parameter, or
    determining the modified threshold value comprises:
        calculating an index parameter based on a sum of a quantization parameter value of the video block and the multiplier value of the beta offset parameter; and
        identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ.

2. The method of claim 1, wherein the index parameter comprises a first index parameter, wherein the deblocking parameter table or equations comprises a first deblocking parameter table or first equations, and wherein determining the modified threshold value comprises determining that the modified threshold value of the respective deblocking decision is equal to a sum of the original threshold value of the respective deblocking decision and the multiplier value of the beta offset parameter, the method further comprising:
    calculating a second index parameter based on a quantization parameter value of the video block; and
    identifying the beta parameter value using the index parameter based on one of a second deblocking parameter table or second equations.

3. The method of claim 1, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises an on/off deblocking decision with the original threshold value equal to β, the modified threshold value is equal to β+A*beta_offset, where A is the multiplier value.

4. The method of claim 1, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises a strong/weak deblocking decision with the original threshold value equal to β/8, the modified threshold value is equal to (β/8)+B*beta_offset, where B is the multiplier value.

5. The method of claim 1, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises a weak filter width deblocking decision with the original threshold value equal to 3β/16, the modified threshold value is equal to (3β/16)+C*beta_offset, where C is the multiplier value.

6. The method of claim 1,
    wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, wherein calculating the index parameter comprises calculating a separate index parameter for each of the plurality of different deblocking decisions based on a different multiplier value of the beta offset parameter selected according to the original threshold value for the respective one of the deblocking decisions, and wherein identifying the beta parameter value comprises identifying a separate beta parameter value using the separate index parameter for each of the different deblocking decisions.

7. The method of claim 1, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, wherein calculating the index parameter comprises calculating a single index parameter for two or more of the plurality of different deblocking decisions based on a single multiplier value of the beta offset parameter selected according to a smallest one of the original threshold values for the deblocking decisions, and wherein identifying the beta parameter value comprises identifying a single beta parameter value using the single index parameter for the two or more different deblocking decisions.

8. The method of claim 1, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises an on/off deblocking decision with the original threshold value equal to $\beta$, the multiplier value is set equal to N for the beta offset parameter resulting in $\Delta\beta$ being equal to 2*N*beta_offset when the index parameter is greater than 27, and the modified threshold value is equal to $\beta+\Delta\beta$.

9. The method of claim 1, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises a strong/weak deblocking decision with the original threshold value equal to $\beta/8$, the multiplier value is set equal to 4 for the beta offset parameter resulting in $\Delta\beta$ being equal to 8*beta_offset when the index parameter is greater than 27, and the modified threshold value is equal to $(\beta+\Delta\beta)/8$.

10. The method of claim 1, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises a weak filter width deblocking decision with the original threshold value equal to $3\beta/16$, the multiplier value is set equal to 3 for the beta offset parameter resulting in $\Delta\beta$ being equal to 6*beta_offset when the index parameter is greater than 27, and the modified threshold value is equal to $(3(\beta+\Delta\beta))/16$.

11. The method of claim 1, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises any of an on/off deblocking decision with the original threshold value equal to $\beta$, a weak/strong deblocking decision with the original threshold value equal to $\beta/8$, or a weak filter width deblocking decision with the original threshold value equal to $3\beta/16$, the multiplier value is set equal to 4 for the beta offset parameter resulting in $\Delta\beta$ being equal to 8*beta_offset when the index parameter is greater than 27, and the modified threshold value of the respective deblocking decision is equal to the original threshold value of the respective deblocking decision determined using β+Δβ.

12. The method of claim 1, wherein decoding the beta offset parameter comprises decoding a syntax element received from a video encoder to determine the beta offset parameter.

13. The method of claim 1, further comprising applying the deblocking filter defined according to the plurality of deblocking decisions to a reconstructed version of the video block for at least one of presentation on a display device or use as a reference block.

14. A method of encoding video data, the method comprising:
   encoding a beta offset parameter ("beta_offset") that controls a deblocking filter for a video block;
   identifying a beta parameter ("β") value used to determine an original threshold value of each of a plurality of deblocking decisions for the deblocking filter;
   determining a modified threshold value of each of the plurality of deblocking decisions for the deblocking filter based on the beta offset parameter; and
   calculating each of the plurality of deblocking decisions for the deblocking filter according to the modified threshold value of the respective deblocking decision, wherein the modified threshold value is modified from the original threshold value of the respective deblocking decision based on a multiplier value of the beta offset parameter selected to cause an integer change in the modified threshold value, wherein the multiplier value comprises an integer, and wherein:
   determining the modified threshold value comprises:
      determining that the modified threshold value of the respective deblocking decision is equal to a sum of the original threshold value of the respective deblocking decision and the multiplier value of the beta offset parameter, or
   determining the modified threshold value comprises:
      calculating an index parameter based on a sum of a quantization parameter value of the video block and the multiplier value of the beta offset parameter; and
      identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ.

15. The method of claim 14, wherein the index parameter comprises a first index parameter, wherein the deblocking parameter table or equations comprises a first deblocking parameter table or first equations, and wherein determining the modified threshold value comprises determining that the modified threshold value of the respective deblocking decision is equal to a sum of the original threshold value of the respective deblocking decision and the multiplier value of the beta offset parameter, the method further comprising:
   calculating a second index parameter based on a quantization parameter value of the video block; and
   identifying the beta parameter value using the index parameter based on one of a second deblocking parameter table or second equations.

16. The method of claim 14, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises an on/off deblocking decision with the original threshold value equal to β, the modified threshold value is equal to β+A*beta_offset, where A is the multiplier value.

17. The method of claim 14, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises a strong/weak deblocking decision with the original threshold value equal to β/8, the modified threshold value is equal to (β/8)+B*beta_offset, where B is the multiplier value.

18. The method of claim 14, wherein determining the modified threshold value comprises determining that the modified threshold value of the respective deblocking decision is equal to a sum of the original threshold value of the respective deblocking decision and the multiplier value of the beta offset parameter, and wherein, when the respective deblocking decision comprises a weak filter width deblocking decision with the original threshold value equal to 3β/16, the modified threshold value is equal to (3β/16)+C*beta_offset, where C is the multiplier value.

19. The method of claim 14,
   wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ,
   wherein calculating the index parameter comprises calculating a separate index parameter for each of the plurality of different deblocking decisions based on a different multiplier value of the beta offset parameter selected according to the original threshold value for the respective one of the deblocking decisions, and
   wherein identifying the beta parameter value comprises identifying a separate beta parameter value using the separate index parameter for each of the different deblocking decisions.

20. The method of claim 14,
   wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ,
   wherein calculating the index parameter comprises calculating a single index parameter for two or more of the plurality of different deblocking decisions based on a single multiplier value of the beta offset parameter selected according to a smallest one of the original threshold values for the deblocking decisions, and wherein identifying the beta parameter value comprises identifying a single beta parameter value using the single index parameter for the two or more different deblocking decisions.

21. The method of claim 14, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises an on/off deblocking decision with the original threshold value equal to $\beta$, the multiplier value is set equal to N for the beta offset parameter resulting in $\Delta\beta$ being equal to 2*N*beta_offset when the index parameter is greater than 27, and the modified threshold value is equal to $\beta+\Delta\beta$.

22. The method of claim 14, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises a strong/weak deblocking decision with the original threshold value equal to $\beta/8$, the multiplier value is set equal to 4 for the beta offset parameter resulting in $\Delta\beta$ being equal to 8*beta_offset when the index parameter is greater than 27, and the modified threshold value is equal to $(\beta+\Delta\beta)/8$.

23. The method of claim 14, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises a weak filter width deblocking decision with the original threshold value equal to $3\beta/16$, the multiplier value is set equal to 3 for the beta offset parameter resulting in $\Delta\beta$ being equal to 6*beta_offset when the index parameter is greater than 27, and the modified threshold value is equal to $(3(\beta+\Delta\beta))/16$.

24. The method of claim 14, wherein determining the modified threshold value comprises calculating an index parameter based on a sum of a quantization parameter value of the video block and the multiplier value of the beta offset parameter, and identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises any of an on/off deblocking decision with the original threshold value equal to $\beta$, a weak/strong deblocking decision with the original threshold value equal to $\beta/8$, or a weak filter width deblocking decision with the original threshold value equal to $3\beta/16$, the multiplier value is set equal to 4 for the beta offset parameter resulting in $\Delta\beta$ being equal to 8*beta_offset when the index parameter is greater than 27, and the modified threshold value of the respective deblocking decision is equal to the original threshold value of the respective deblocking decision determined using $\beta+\Delta\beta$.

25. The method of claim 14, wherein encoding the beta offset parameter comprises encoding a syntax element to indicate the beta offset parameter to a video decoder.

26. The method of claim 14, further comprising applying the deblocking filter defined according to the plurality of deblocking decisions to a reconstructed version of the video block for use as a reference block.

27. A video coding device comprising:

a memory that stores video data; and a processor configured to code a beta offset parameter ("beta_offset") that controls a deblocking filter for a video block, identify a beta parameter ("$\beta$") value used to determine an original threshold value of each of a plurality of deblocking decisions for the deblocking filter, determine a modified threshold value of each of the plurality of deblocking decisions for the deblocking filter based on the beta offset parameter, and calculate each of the plurality of deblocking decisions for the deblocking filter according to the modified threshold value of the respective deblocking decision, wherein the modified threshold value is modified from the original threshold value of the respective deblocking decision based on a multiplier value of the beta offset parameter selected to cause an integer change in the modified threshold value, wherein the multiplier value comprises an integer, and wherein:

to determine the modified threshold value, the processor is configured to:

determine that the modified threshold value of the respective deblocking decision is equal to a sum of the original threshold value of the respective deblocking decision and the multiplier value of the beta offset parameter, or to determine the modified threshold value, the processor is configured to:

calculate an index parameter based on a sum of a quantization parameter value of the video block and the multiplier value of the beta offset parameter; and identify the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$.

28. The video coding device of claim 27, wherein the index parameter comprises a first index parameter, wherein the deblocking parameter table or equations comprises a first deblocking parameter table or first equations, wherein to determine the modified threshold value, the processor is configured to determine that the modified threshold value of the respective deblocking decision is equal to a sum of the original threshold value of the respective deblocking decision and the multiplier value of the beta offset parameter, and wherein the processor is configured to:

calculate a second index parameter based on a quantization parameter value of the video block; and identify the beta parameter value using the index parameter based on one of a second deblocking parameter table or second equations.

29. The video coding device of claim 27, wherein to determine the modified threshold value, the processor is configured to determine that the modified threshold value of the respective deblocking decision is equal to a sum of the original threshold value of the respective deblocking decision and the multiplier value of the beta offset parameter, and wherein, when the respective deblocking decision comprises an on/off deblocking decision with the original threshold value equal to $\beta$, the modified threshold value is equal to $\beta+A*beta\_offset$, where A is the multiplier value.

30. The video coding device of claim 27, wherein to determine the modified threshold value, the processor is configured to determine that the modified threshold value of the respective deblocking decision is equal to a sum of the original threshold value of the respective deblocking decision and the multiplier value of the beta offset parameter, and wherein, when the respective deblocking decision comprises a strong/weak deblocking decision with the original threshold value equal to $\beta/8$, the modified threshold value is equal to $(\beta/8)+B*beta\_offset$, where B is the multiplier value.

31. The video coding device of claim 27, wherein to determine the modified threshold value, the processor is configured to determine that the modified threshold value of the respective deblocking decision is equal to a sum of the original threshold value of the respective deblocking decision and the multiplier value of the beta offset parameter, and wherein, when the respective deblocking decision comprises a weak filter width deblocking decision with the original threshold value equal to $3\beta/16$, the modified threshold value is equal to $(3\beta/16)+C*beta\_offset$, where C is the multiplier value.

32. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein the processor is configured to:
calculate a separate index parameter for each of the plurality of different deblocking decisions based on a different multiplier value of the beta offset parameter selected according to the original threshold value for the respective one of the deblocking decisions; and identify a separate beta parameter value using the separate index parameter for each of the different deblocking decisions.

33. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein the processor is configured to:
calculate a single index parameter for two or more of the plurality of different deblocking decisions based on a single multiplier value of the beta offset parameter selected according to a smallest one of the original threshold values for the deblocking decisions; and identify a single beta parameter value using the single index parameter for the two or more different deblocking decisions.

34. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, and wherein, when the respective deblocking decision comprises an on/off deblocking decision with the original threshold value equal to $\beta$, the multiplier value is set equal to N for the beta offset parameter resulting in $\Delta\beta$ being equal to $2*N*beta\_offset$ when the index parameter is greater than 27, and the modified threshold value is equal to $\beta+\Delta\beta$.

35. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ, and wherein, when the respective deblocking decision comprises a strong/weak deblocking decision with the original threshold value equal to β/8, the multiplier value is set equal to 4 for the beta offset parameter resulting in Δβ being equal to 8*beta_offset when the index parameter is greater than 27, and the modified threshold value is equal to (β+Δβ)/8.

36. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ, and wherein, when the respective deblocking decision comprises a weak filter width deblocking decision with the original threshold value equal to 3β/16, the multiplier value is set equal to 3 for the beta offset parameter resulting in Δβ being equal to 6*beta_offset when the index parameter is greater than 27, and the modified threshold value is equal to (3(β+Δβ))/16.

37. The video coding device of claim 27,
wherein to determine the modified threshold value, the processor is configured to calculate an index parameter based on a sum of a quantization parameter value of the video block and the multiplier value of the beta offset parameter, and identify the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ, and wherein, when the respective deblocking decision comprises any of an on/off deblocking decision with the original threshold value equal to β, a weak/strong deblocking decision with the original threshold value equal to β/8, or a weak filter width deblocking decision with the original threshold value equal to 3β/16, the multiplier value is set equal to 4 for the beta offset parameter resulting in Δβ being equal to 8*beta_offset when the index parameter is greater than 27, and the modified threshold value of the respective deblocking decision is equal to the original threshold value of the respective deblocking decision determined using β+Δβ.

38. A video coding device comprising:
means for coding a beta offset parameter ("beta_offset") that controls a deblocking filter for a video block;
means for identifying a beta parameter ("β") value used to determine an original threshold value of each of a plurality of deblocking decisions for the deblocking filter;
means for determining a modified threshold value of each of the plurality of deblocking decisions for the deblocking filter based on the beta offset parameter; and
means for calculating each of the plurality of deblocking decisions for the deblocking filter according to the modified threshold value of the respective deblocking decisions, wherein the modified threshold value is modified from the original threshold value of the respective deblocking decision based on a multiplier value of the beta offset parameter selected to cause an integer change in the modified threshold value, wherein the multiplier value comprises an integer, and wherein:
the means for determining the modified threshold value comprises:
means for determining that the modified threshold value of the respective deblocking decision is equal to a sum of the original threshold value of the respective deblocking decision and the multiplier value of the beta offset parameter, or
the means for determining the modified threshold value comprises:
means for calculating an index parameter based on a sum of a quantization parameter value of the video block and the multiplier value of the beta offset parameter; and
means for identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ.

39. The video coding device of claim 38, wherein the index parameter comprises a first index parameter, wherein the deblocking parameter table or equations comprises a first deblocking parameter table or first equations, and wherein the means for determining the modified threshold value comprises means for determining that the modified threshold value of the respective deblocking decision is equal to a sum of the original threshold value of the respective deblocking decision and the multiplier value of the beta offset parameter, the device further comprising:
means for calculating a second index parameter based on a quantization parameter value of the video block; and
means for identifying the beta parameter value using the index parameter based on one of a second deblocking parameter table or second equations.

40. The video coding device of claim 38,
wherein the means for determining the modified threshold value comprises means for calculating an index parameter based on a sum of a quantization parameter value of the video block and the multiplier value of the beta offset parameter, and means identifying the beta parameter value using the index parameter based on one of a deblocking parameter table or equations, wherein the multiplier value of the beta offset parameter results in an increment of the beta parameter value ("Δβ") that causes an integer change in the modified threshold value, the modified threshold value of the respective deblocking decision being equal to the original threshold value of the respective deblocking decision determined using β+Δβ, the device further comprising:
means for calculating a separate index parameter for each of the plurality of different deblocking decisions based on a different multiplier value of the beta offset parameter selected according to the original threshold value for the respective one of the deblocking decisions; and means for identifying a separate beta parameter value using the separate index parameter for each of the different deblocking decisions.

41. The video coding device of claim 38, wherein the means for determining the modified threshold value comprises means for calculating an index parameter based on a sum of a quantization parameter value of the video block and the multiplier value of the beta offset parameter, and means identifying the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$, the device further comprising:

means for calculating a single index parameter for two or more of the plurality of different deblocking decisions based on a single multiplier value of the beta offset parameter selected according to a smallest one of the original threshold values for the deblocking decisions; and means for identifying a single beta parameter value using the single index parameter for the two or more different deblocking decisions.

42. A non-transitory computer readable medium comprising instructions for coding video data that when executed cause one or more processors to:

code a beta offset parameter ("beta_offset") that controls a deblocking filter for a video block;

identify a beta parameter ("$\beta$") value used to determine an original threshold value of each of a plurality of deblocking decisions for the deblocking filter;

determine a modified threshold value of each of the plurality of deblocking decisions for the deblocking filter based on the beta offset parameter; and calculate each of the plurality of deblocking decisions for the deblocking filter according to the modified threshold value of the respective deblocking decision, wherein the modified threshold value is modified from the original threshold value of the respective deblocking decision based on a multiplier value of the beta offset parameter selected to cause an integer change in the modified threshold value, wherein the multiplier value comprises an integer, and wherein:

the instructions that when executed cause one or more processors to determine the modified threshold value comprise instructions that when executed cause the one or more processors to:

determine that the modified threshold value of the respective deblocking decision is equal to a sum of the original threshold value of the respective deblocking decision and the multiplier value of the beta offset parameter, or the instructions that when executed cause one or more processors to determine the modified threshold value comprise instructions that when executed cause the one or more processors to:

calculate an index parameter based on a sum of a quantization parameter value of the video block and the multiplier value of the beta offset parameter; and identify the beta parameter value using the index parameter based on one of a deblocking parameter table or equations, wherein the multiplier value of the beta offset parameter results in an increment of the beta parameter value ("$\Delta\beta$") that causes an integer change in the modified threshold value, the modified threshold value of the respective deblocking decision being equal to the original threshold value of the respective deblocking decision determined using $\beta+\Delta\beta$.

* * * * *